United States Patent
Naito

(10) Patent No.: US 8,626,042 B2
(45) Date of Patent: Jan. 7, 2014

(54) DETECTING APPARATUS AND IMAGE FORMING APPARATUS INCLUDING THE SAME

(75) Inventor: Yuuta Naito, Tokyo (JP)

(73) Assignee: Canon Kabushiki Kaisha (JP)

( * ) Notice: Subject to any disclaimer, the term of this patent is extended or adjusted under 35 U.S.C. 154(b) by 244 days.

(21) Appl. No.: 13/106,360

(22) Filed: May 12, 2011

(65) Prior Publication Data

US 2011/0280595 A1    Nov. 17, 2011

(30) Foreign Application Priority Data

May 13, 2010   (JP) .................................. 2010-111239

(51) Int. Cl.
*G03G 15/01*   (2006.01)
*G03G 15/00*   (2006.01)

(52) U.S. Cl.
USPC .............................. 399/301; 399/49; 399/74

(58) Field of Classification Search
USPC ................................... 399/49, 72, 73, 74, 301
See application file for complete search history.

(56) References Cited

U.S. PATENT DOCUMENTS 5,083,161 A   *   1/1992   Borton et al. .................... 399/49

FOREIGN PATENT DOCUMENTS

JP   2000-089540 A   3/2000
JP   2002-055497 A   2/2002

* cited by examiner

*Primary Examiner* — Hoang Ngo
(74) *Attorney, Agent, or Firm* — Rossi, Kimms & McDowell LLP

(57) ABSTRACT

Provided is a detecting apparatus including an illumination optical system for emitting an image bearing member with a light beam emitted from a light source unit, an imaging optical system including an imaging optical element for imaging an image on the surface of the image bearing member, a light receiving unit for detecting the image on the image bearing member which has been imaged by the imaging optical system, and a calculation unit for detecting image information on the image on the image bearing member from a detection signal received from the light receiving unit. In the detecting apparatus, at least one optical plane of the imaging optical element is configured to refract an imaging system principal ray after passing therethrough in a direction of farther becoming apart from the light source unit than the imaging system principal ray before passing through the optical plane.

19 Claims, 12 Drawing Sheets $\theta 1 = |\theta e1(deg) - \theta i1(deg)|$

DETECTING APPARATUS AND IMAGE FORMING APPARATUS INCLUDING THE SAME

BACKGROUND OF THE INVENTION

1. Field of the Invention

The present invention relates to a detecting apparatus used for an image forming apparatus such as a copier, a printer, or a facsimile, to which an electrophotographic process or an electrostatic recording process is applied. In particular, the present invention relates to an image information detection apparatus, which is suited for detecting image information on a pattern image for position detection formed on an image bearing member.

2. Description of the Related Art

In a conventional image forming apparatus for obtaining a multiple color image, images having different colors are formed in multiple image forming sections, paper is conveyed by a conveyer unit such as a conveyer belt, and the images are transferred onto the paper while being overlapped, to thereby perform multiple color image formation. In a case of obtaining a full color image by performing multiple color developing, even a slight overlap positional deviation of the paper deteriorates image quality. For example, in a case of a resolution of 400 dpi, one pixel is set to 63.5 μm, and even an overlap positional deviation of a fraction of this value appears as a change of a color misregistration or a color drift and significantly deteriorates an image.

In the initial stage of development of a color image forming apparatus, the multiple color developing is performed by optical scanning with a single image forming section, that is, an image forming section having the same optical characteristic, thereby alleviating the overlap positional deviation of images. However, this method has a problem of requiring much time to output a multiplexed image or a full color image. In order to solve this problem, there is known a color image forming apparatus employing a method of forming images by using optical scanners for respective colors so as to separately obtain images of the respective colors and overlaying the images of the respective colors one on another on the paper conveyed by a conveyer section (see Japanese Patent Application Laid-Open No. 2000-089540 and Japanese Patent Application Laid-Open No. 2002-055497). However, in this method, a color misregistration has been a big problem, which is caused when overlaying the images of the respective colors one on another on the paper.

Conventionally, in many color image forming apparatuses, an image information detection apparatus for detecting the color misregistration at this time is mounted. In the image information detection apparatus, a light beam emitted from a light source unit is condensed at an illumination lens, and a pattern image for position detection depicted on a recording material (image bearing member) being a transferring belt is illuminated with the condensed light beam. Then, image information such as position information or density information on a recording member and a pattern image depicted thereon is detected by a light receiving unit via an imaging lens. The image information on the pattern image is detected according to detection signals detected by the light receiving unit and the driving of an image forming section (image forming unit) is controlled to output images of respective colors.

In recent years, there is an increasingly vocal demand for overall downsizing/simplification of a color image forming apparatus. This also increases a demand for overall downsizing/simplification of an image information detection apparatus. The color image forming apparatus disclosed in Japanese Patent Application Laid-Open No. 2000-089540 achieves the downsizing/simplification by using an illumination optical element (illumination lens) and an imaging optical element (imaging lens) as the same part. Further, the detecting apparatus disclosed in Japanese Patent Application Laid-Open No. 2002-055497 achieves the simplification by unitarily forming the illumination optical element and the imaging optical element as one member.

As one method for achieving the downsizing and simplification of the image information detection apparatus, there is a method of reducing an angle (incident angle of an illumination optical system) between a principal ray of the illumination optical system for illuminating the pattern image and a surface normal to the recording member. This downsizes an illumination optical element and facilitates molding of an element. However, this method is subject to a large number of constraints in terms of layout because a substrate of a light source unit and a substrate of the light receiving unit are in so close vicinity to each other as to cause interference therebetween.

On the other hand, it is possible to avoid the interference between the substrates by increasing a distance between the light source unit and the recording member, but an optical path length becomes longer, which causes the overall apparatus to become larger. Further, if the substrates are brought into close vicinity to each other with less space therebetween, it becomes difficult to appropriately adjust positions of respective members, which causes the occurrence of a large number of color misregistrations.

SUMMARY OF THE INVENTION

An object of the present invention is to provide a detecting apparatus capable of detecting a pattern image for position detection formed on a recording member (image bearing member) by securing sufficient space between both substrates of a light source unit and a light receiving unit in terms of layout and performing appropriate adjustment while achieving overall downsizing and simplification.

In order to achieve the above-mentioned object, the present invention provides a detecting apparatus including; a light source unit, an illumination optical system for emitting a light beam exiting from the light source unit on a surface of the image bearing member, a light receiving unit for detecting the light beam reflected by the image formed on the surface of the image bearing member; and a light receiving optical system including a light receiving optical element for imaging the light beam reflected by the image formed on the surface of the image bearing member on the light receiving unit, in which, within a main scanning section, the light receiving optical element includes an optical plane for causing a principal ray of the light beam that has been reflected by the surface of the image bearing member and is to enter the light receiving unit to bend in a direction of becoming apart from the light source unit.

In the detecting apparatus, it is preferred that, within the main scanning section, the principal ray of the light beam before passing through the optical plane of the light receiving optical element, which has been reflected by the surface of the image bearing member and is to enter the light receiving unit, and the principal ray of the light beam after passing through the optical plane of the light receiving optical element, which has been reflected by the surface of the image bearing member and is to enter the light receiving unit, have an angular difference θ1 (deg.) satisfying 0<θ1≤15 therebetween.

Further, it is preferred that, within the main scanning section, the optical plane of the light receiving optical element include a refractive plane having such a curvature that an optical axis of the optical plane is tilted with respect to an optical axis of the light receiving optical system.

Alternatively, it is preferred that, within the main scanning section, the optical plane of the light receiving optical element include a refractive plane having such a curvature that an optical axis of the optical plane is shifted with respect to an optical axis of the light receiving optical system.

Further, it is preferred that, within the main scanning section, the illumination optical system have an optical axis perpendicular to the surface of the image bearing member.

Further, the present invention provides a detecting apparatus including; a light source unit, an illumination optical system including an illumination optical element for emitting a light beam exiting from the light source unit on a surface of the image bearing member, a light receiving unit for detecting the light beam reflected by the image formed on the surface of the image bearing member; and a light receiving optical system for imaging the light beam reflected by the image formed on the surface of the image bearing member on the light receiving unit, in which, within a main scanning section, the illumination optical element includes an optical plane for causing a principal ray of the light beam that has exited from the light source unit and is to enter the light receiving unit to bend in a direction of becoming apart from the light receiving unit.

Further, in the detecting apparatus, it is preferred that, within the main scanning section, the principal ray of the light beam before passing through the optical plane of the illumination optical element, which has exited from the light source unit and is to enter the light receiving unit, and the principal ray of the light beam after passing through the optical plane of the illumination optical element, which has exited from the light source unit and is to enter the light receiving unit, have an angular difference θ2 expressed in degrees satisfying 0<θ2≤15 therebetween.

Further, it is preferred that, within the main scanning section, the optical plane of the illumination optical element include a refractive plane having such a curvature that an optical axis of the optical plane is tilted with respect to an optical axis of the illumination optical system.

Alternatively, it is preferred that, within the main scanning section, the optical plane of the illumination optical element include a refractive plane having such a curvature that an optical axis of the optical plane is shifted with respect to an optical axis of the illumination optical system.

Further, in the detecting apparatus, it is more preferred that; the light receiving optical system include a light receiving optical element for imaging the image formed on the surface of the image bearing member on the light receiving unit; and within the main scanning section, the light receiving optical element include an optical plane for causing the principal ray of the light beam that has been reflected by the surface of the image bearing member and is to enter the light receiving unit to bend in a direction of becoming apart from the light source unit.

Further, the present invention provides an image forming apparatus including; the above-mentioned detecting apparatus; and multiple photosensitive drums.

Further, the present invention also provides an image forming apparatus including; the above-mentioned detecting apparatus; and multiple photosensitive drums.

According to the present invention, the detecting apparatus capable of detecting the pattern image for position detection formed on the recording member (image bearing member) by securing sufficient space between both the substrates of the light source unit and the light receiving unit in terms of layout and performing appropriate adjustment while achieving overall downsizing and simplification can be obtained.

Further features of the present invention will become apparent from the following description of exemplary embodiments with reference to the attached drawings.

DESCRIPTION OF THE EMBODIMENTS

Figure 1:
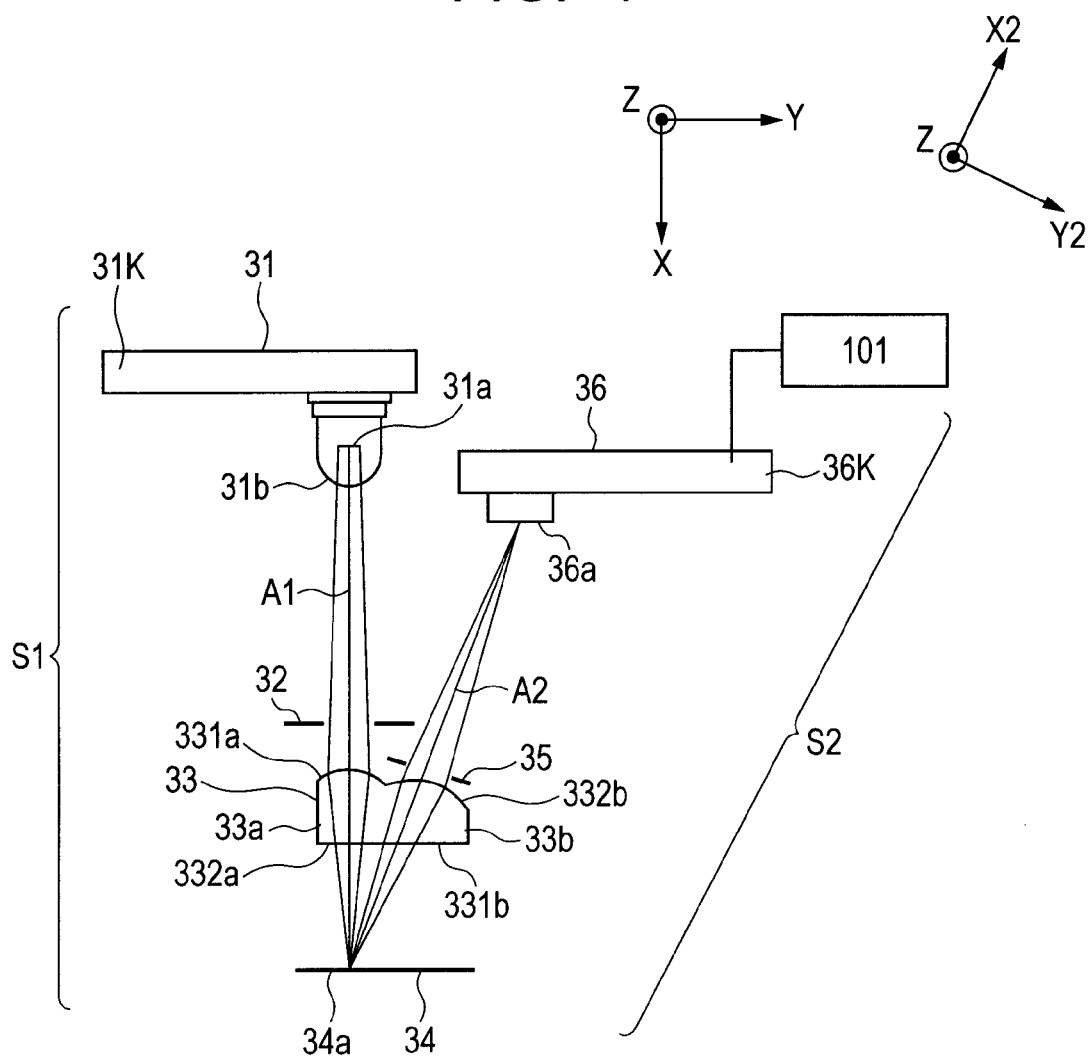
FIG. 1 is a schematic view of a main portion of an image information detection apparatus according to Example 1 of the present invention.

Preferred embodiments of the present invention will now be described in detail in accordance with the accompanying drawings.

Hereinafter, an image information detection apparatus according to the present invention and an image forming apparatus including the same are described. The image information detection apparatus according to the present invention includes: a light source 31; and an illumination optical system S1 for illuminating a surface of an image bearing member (transferring belt) 34 that conveys an image with a light beam exiting from the light source 31. Further, the image information detection apparatus includes: an imaging optical system S2 including an imaging lens 33b for imaging an image (pattern image) 34a formed on the image bearing member 34 and a diaphragm 35 for limiting a diameter of the light beam; and a light receiving element (light receiving unit) 36 for detecting the image 34a on the image bearing member 34 which has been imaged by the imaging optical system. In addition, the image information detection apparatus includes a calculation unit 101 for calculating position information on the image 34a formed on the image bearing member 34 based on a detection signal obtained from the light receiving element 36.

EXAMPLE 1

FIG. 1 is a sectional view of a main portion of the image information detection apparatus according to Example 1 of the present invention. The image information detection apparatus according to Example 1 of the present invention is used for a color image forming apparatus. A configuration of the image information detection apparatus is described with reference to FIG. 1 illustrating the illumination optical system S1 and the light receiving optical system (imaging optical system) S2. The light source (light source unit) 31 constituting one part of an illumination unit is formed of an LED light source. The light source 31 includes a light emitting surface 31a whose shape is a square of 0.35 mm on one side and a condensing part 31b for condensing the light beam emitted from the light emitting surface 31a.

The diaphragm 32 constituting one part of the illumination optical system S1 limits the light beam emitted from the light source 31. An optical element 33 is obtained from the same material by unitarily molding an illumination lens 33a constituting one part of the illumination optical system S1 and the imaging lens 33b constituting one part of the light receiving optical system S2. The transferring belt 34 serves as a recording member (image bearing member) that conveys pattern images (images) 34a for position detection formed of toner in respective colors. The diaphragm 35 constituting one part of the light receiving optical system S2 limits the light beam exiting from the imaging lens 33b serving as a light receiving optical element. The light receiving element 36 constitutes one part of a light receiving unit. The light receiving element 36 includes a light receiving surface 36a whose shape is a square of 1 mm on one side. FIG. 1 also illustrates a light source substrate 31k, a substrate 36k for a light receiving unit, a front surface (lens surface) 331a and a back surface (lens surface) 332a of the illumination lens 33a, and a front surface (lens surface) 331b and a back surface (lens surface) 332b of the imaging lens 33b.

In FIG. 1, a direction perpendicular to the surface of the transferring belt 34 is set as an X direction, a direction parallel to the drawing sheet and perpendicular to the X direction is set as a Y direction, and a direction perpendicular to the drawing sheet is set as a Z direction. The Y direction is a main scanning direction of an image forming apparatus. The Z direction is a sub scanning direction of the image forming apparatus, and is a conveyance direction of the pattern image 34a for position detection. The light beam exiting from the light source 31 is limited by the diaphragm 32, and the pattern image 34a on a surface of the transferring belt 34 is illuminated through the illumination lens 33a serving as an illumination optical element. At this time, a principal ray (central ray in terms of intensity) (illumination system principal ray) A1 of the light beam exiting from the light source 31 perpendicularly enters the surface of the transferring belt 34. Light (irregularly reflected light) scattered by the pattern image 34a formed on the surface of the transferring belt (image bearing member) 34 is condensed by the imaging lens 33b, has the light beam limited by the diaphragm 35, and received by the light receiving element 36.

As the transferring belt 34 conveys the pattern image 34a, there is a change in a received light intensity of the light received by the light receiving element 36. The calculation unit 101 detects a formation position (position information) of the pattern image 34a from the detection signal of the received light intensity and calculates a formation positional deviation amount from a preset reference position. Noise present in the detection signal causes a problem when the formation positional deviation amount is calculated. As a method for improving a signal-to-noise ratio, there is a method of increasing the received light intensity of the light received by the light receiving element 36. In order to increase the received light intensity, in the illumination optical system S1, the light emitting surface 31a and the surface of the transferring belt 34 are caused to have a substantially optical conjugate relation by the condensing part 31b and the illumination lens 33a.

Figure 2A:
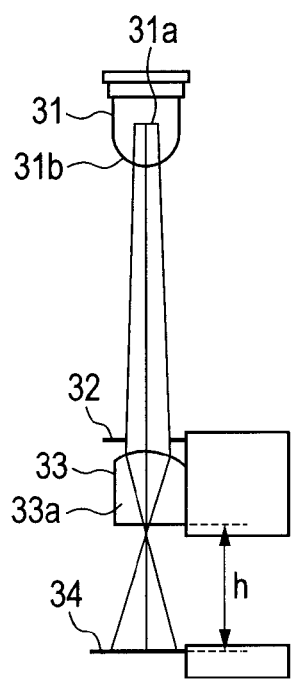
FIGS. 2A, 2B and 2C are diagrams each illustrating a light beam obtained when a conjugate plane is changed in the image information detection apparatus according to the present invention.
Figure 2B:
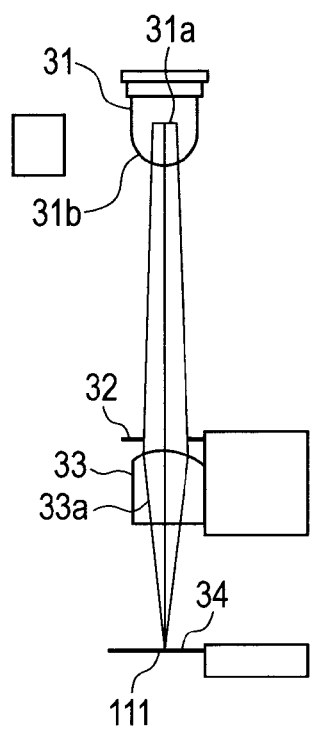
Figure 2C:
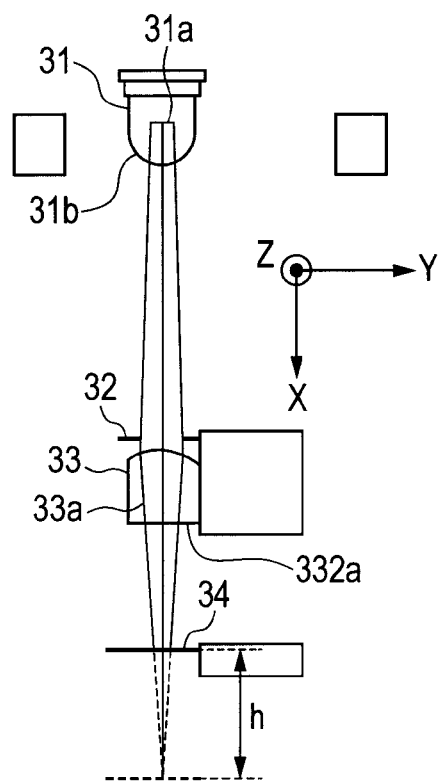

FIGS. 2A to 2C and FIG. 3 are explanatory diagrams for describing effectiveness of the above-mentioned illumination in increasing the received light intensity. FIGS. 2A and 2B illustrate optical paths of an illumination optical system obtained when a position of a conjugate plane of the light emitting surface 31a is set as a position of the back surface of the illumination lens 33a in FIG. 2A and set as a position of the surface of the transferring belt 34 in FIG. 2B, respectively. In addition, FIG. 2C illustrates an optical path of the illumination optical system obtained when a gap between the back surface 332a of the illumination lens 33a and the surface of the transferring belt 34 is set as a distance h and the position of the conjugate plane of the light emitting surface 31a is set as a position spaced apart from the surface of the transferring belt 34 in a vertical direction by the distance h.

Figure 3:
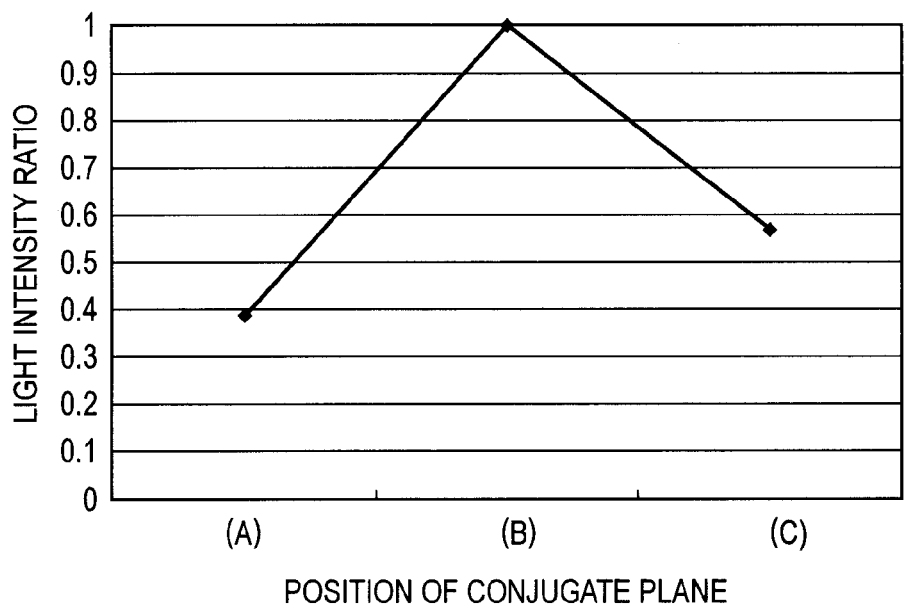
FIG. 3 is a graph illustrating an irradiation light intensity ratio obtained when the conjugate plane is changed in the image information detection apparatus according to the present invention.

FIG. 3 illustrates a light intensity ratio of the light beam emitted from the illumination optical system S1, at which a light receiving region on the surface of the transferring belt 34 is illuminated in the above-mentioned cases. It is understood that an illumination light intensity within the light receiving region is largest when the conjugate plane is set as the transferring belt 34. Here, having a "substantially optical conjugate relationship" described above refers to having such a relationship between the object point and the image plane that the following expression is established:

$$|\Delta|<0.3L$$

where L represents a distance between the object point and a paraxial image plane, and $\Delta$ represents a distance between the paraxial image plane and a real image plane. When the above-mentioned expression is established, a conjugate image of the object point is projected onto the image plane. When the above-mentioned relationship is established, a light emitting surface conjugate image 111 serving as the conjugate image of the light emitting surface 31a is projected onto the surface of the transferring belt 34. Therefore, the shape of the light emitting surface 31a affects a detection signal obtained at the time of detection by the light receiving element 36. The light emitting surface 31a is square, and hence light emitting surface conjugate image 111 on the surface of the transferring belt 34 is square. For the same purpose as the illumination optical system S1, also in the light receiving optical system S2, the surface of the transferring belt 34 and the light receiving surface 36a are caused to have a substantially optical conjugate relationship by the imaging lens 33b.

An imaging magnification $\mu_2$ of the light receiving optical system S2 of this example is defined by assuming that the surface of the transferring belt 34 is the object point and that the light receiving surface 36a is the image plane. Here, $\beta_2 = -1.4$. A light receiving surface conjugate image 112 is considered, which is a conjugate image obtained by assuming that the light receiving surface 36a is the object point and that the surface of the transferring belt 34 is the image plane. The light receiving element 36 receives scattered light from the region of the light receiving surface conjugate image 112. Therefore, the shape of the light receiving surface 36a affects a detection signal.

In the light receiving optical system S2 of this example, the optical axis (principal ray) (imaging principal ray) A2 thereof is located with an angle of 25° with respect to the perpendicular direction (–X direction) of the surface of the transferring belt 34. Therefore, the light receiving surface conjugate image 112 exhibiting different magnifications in the main scanning direction (Y direction) within its region does not have a precise square shape but has a distorted shape. However, this does not cause a problem in the description of the effect obtained from the present invention, and hence the description is made hereinbelow on the assumption that the light receiving surface conjugate image 112 is square.

Figure 4:
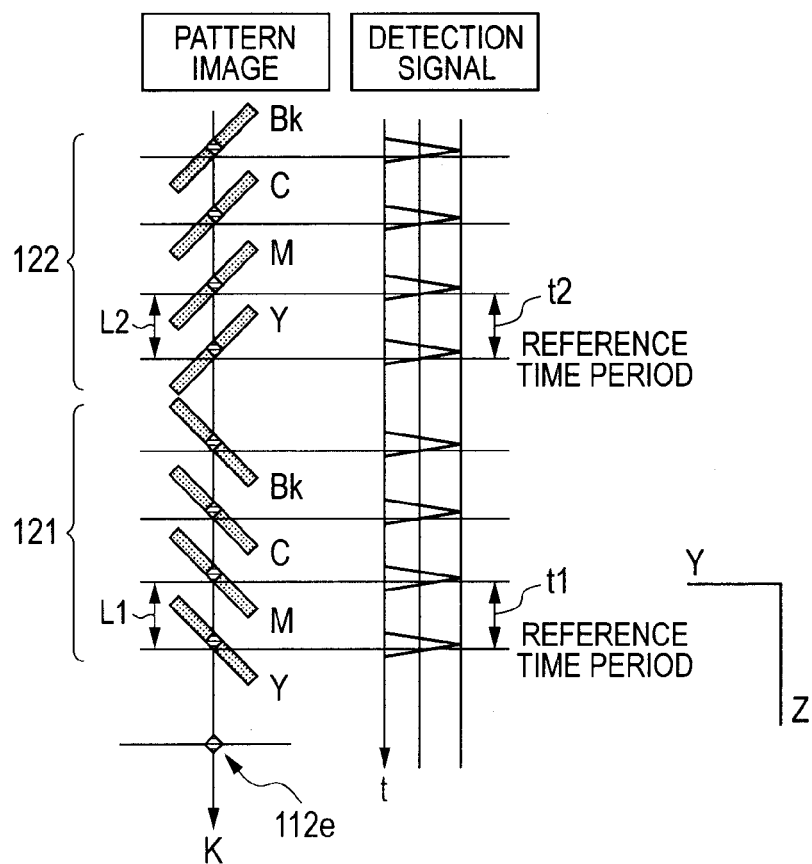
FIG. 4 is an explanatory diagram of pattern images formed on a recording member when there is no formation positional deviation.

FIG. 4 is an explanatory diagram illustrating pattern images 121 and 122 formed on the surface of the transferring belt 34 for detecting the formation positional deviation amount of the respective colors. FIG. 4 illustrates an ideal case where no formation positional deviation occurs in the pattern images. The dots inside the pattern images each indicate a center position of the pattern image. Here, the center position of the light receiving surface conjugate image 112 is set as a light receiving surface conjugate image center position 112e. A K-axis parallel to a Z-axis is assumed. The K-axis passes the light receiving surface conjugate image center positions 112e and coincides with the surface of the transferring belt 34. The pattern images have the center positions arrayed along the K-axis at predetermined intervals.

In FIG. 4, the pattern images are arranged in the order of yellow (Y), magenta (M), cyan (C), and black (Bk) and in the order of the pattern image 121 and the pattern image 122, but the present invention is not limited thereto. Long side directions of the pattern images 121 and 122 are each located with an angle of 45 degrees with respect to the K-axis.

The transferring belt 34 conveys the pattern images 121 and 122 at a conveying speed V. FIG. 4 also illustrates detection signals obtained when a corresponding K coordinate reaches the light receiving surface conjugate image center position 112e. The image information detection apparatus detects a time period t required for a straight line portion of the pattern images 121 and 122 to pass the light receiving surface conjugate image center position 112e. A detection time is obtained with reference to a detection time instant of a reference color (yellow in this example) pattern image. Further, the K coordinate determined at the time of detection is set as a detection position. The detection position is determined with reference to a detection position of the reference color pattern image Y. A detection position L of the pattern image is calculated from the detection time t and the conveying speed V as follows.

$$L = t \times V \quad \text{(Expression 1)}$$

When no formation positional deviation occurs, the pattern images are arrayed at the predetermined intervals, and hence the detection position L takes a predetermined known value. This position is set as a "estimated detection position".

Figure 5:
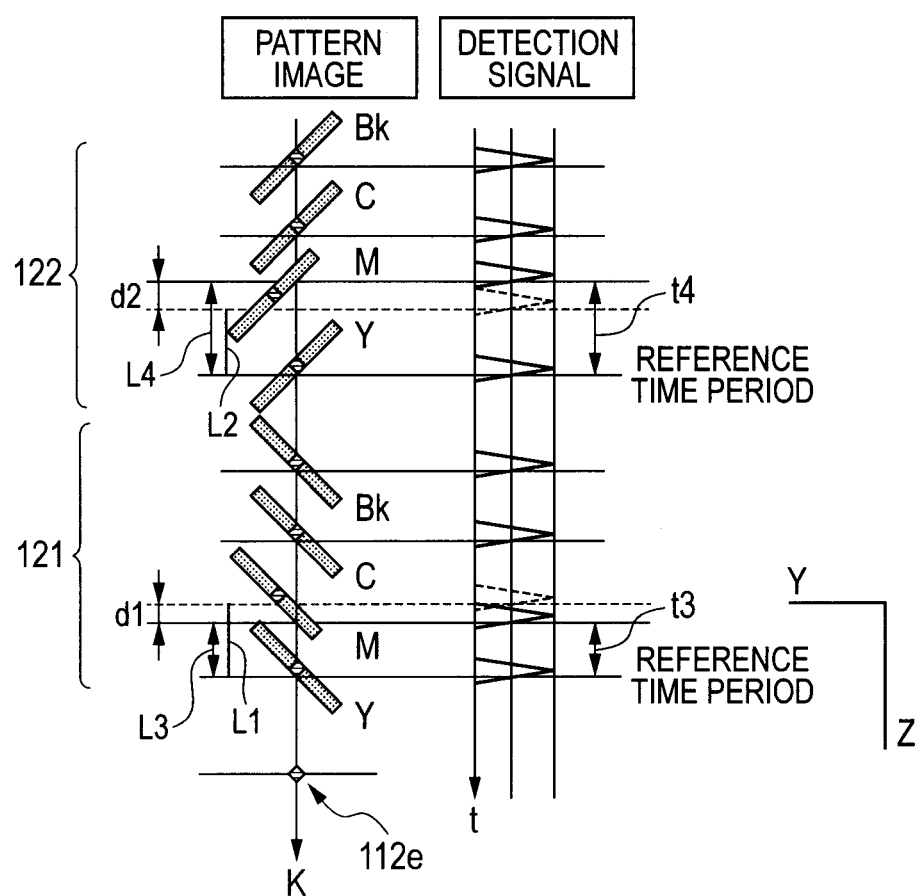
FIG. 5 is an explanatory diagram of the pattern images formed on the recording member when there is a formation positional deviation in a magenta (M) color.

Taking a magenta color of FIG. 4 as an example, a detection position L1 of the pattern image 121 is calculated from a detection time t1 as $L1 = t1 \times V$. In the same manner, a detection position L2 of the pattern image 122 is calculated from a detection time t2 as $L2 = t2 \times V$. No formation positional deviation occurs, and hence the detection positions L1 and L2 are the same as the estimated detection positions, thereby taking the predetermined known values. FIG. 5 is an explanatory diagram of the pattern images obtained when a formation positional deviation occurs. FIG. 5 illustrates the pattern images obtained when a formation positional deviation occurs in the magenta pattern images M. The deviation amounts d1 and d2 of the center positions of the magenta pattern images M from that in the case where no formation positional deviation occurs are the formation positional deviation amounts of the magenta pattern images.

The detection signals at this time are also illustrated. The detection positions and the detection times in the case where no formation positional deviation occurs are indicated by the dotted lines. There are deviations between the detection positions and the estimated detection positions. The deviation amounts are set as "detection deviation amounts". By obtaining detection positions L3 and L4 from detection times t3 and t4, respectively, of the pattern images 121 and 122, detection deviation amounts d1 and d2 of the pattern images 121 and 122, respectively, are obtained as follows.

$$d1 = L3 - L1 = (t3 - t1) \times V \quad \text{(Expression 2)}$$

From the detection deviation amounts, a formation positional deviation amount $\Delta Y$ in the main scanning direction and a formation positional deviation amount $\Delta Z$ in the sub scanning direction are respectively calculated as follows.

$$\Delta Y = \frac{d1 - d2}{2} = \frac{(t3 - t1) - (t4 - t2)}{2} \times V \quad \text{(Expression 3)}$$

$$\Delta Z = \frac{d1 + d2}{2} = \frac{(t3 - t1) + (t4 - t2)}{2} \times V$$

Results thereof are respectively color misregistration amounts of magenta in the main/sub scanning directions with reference to the reference color.

Figure 6:
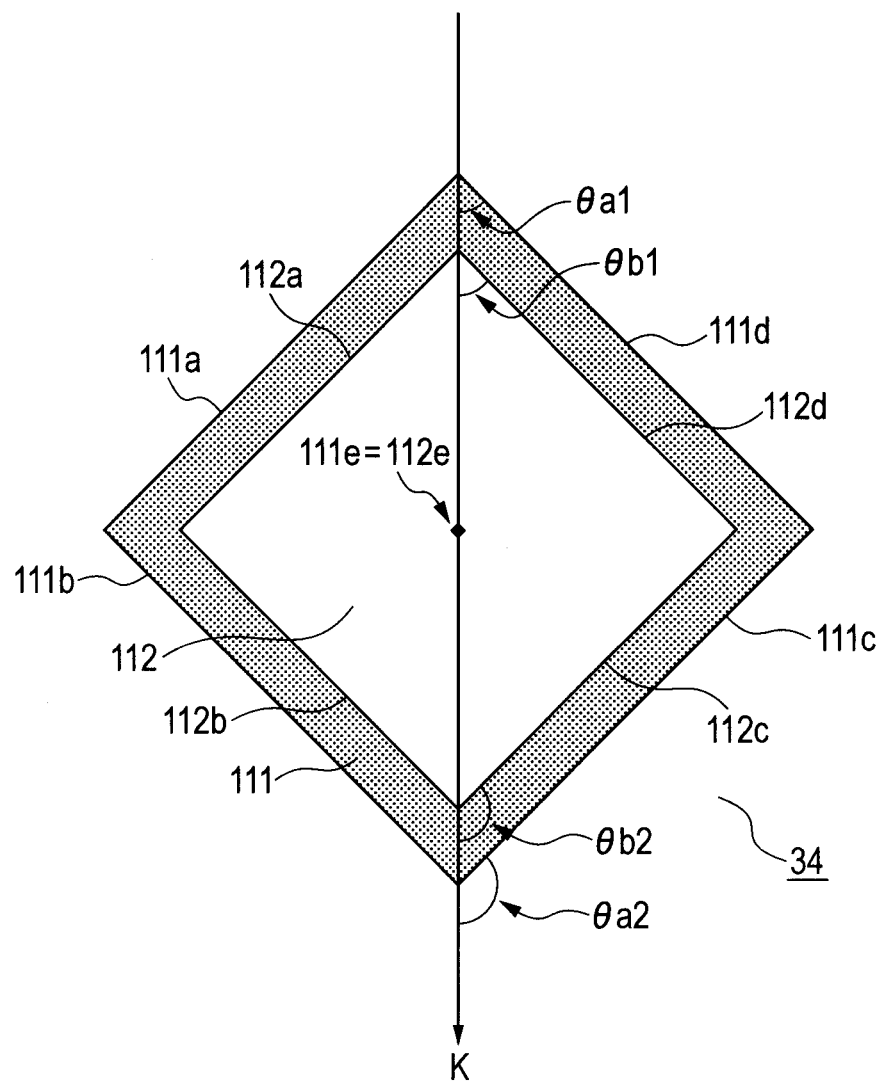
FIG. 6 is an explanatory diagram of a light emitting surface conjugate image (111) and a light receiving surface conjugate image (112).

FIG. 6 illustrates the light emitting surface conjugate image 111 and the light receiving surface conjugate image 112 on the transferring belt 34. The light emitting surface conjugate image 111 includes four straight line portions 111a, 111b, 111c, and 111d and a light emitting surface conjugate image center position 111e. The straight line portions 111a and 111b are parallel with the straight line portions 111c and 111d, respectively. Angles θa1 and θa2 formed between the straight line portions 111d and 111c and the Z direction (K direction) in the traveling direction (moving direction) are 45° and 135°, respectively. From one side of the light emitting surface being 0.35 mm with the optical magnification $\beta_1 = -2.6$, one side of the light emitting surface conjugate image 111 is calculated as 0.91 mm (0.35×2.6).

The light receiving surface conjugate image 112 includes four straight line portions 112a, 112b, 112c, and 112d, and the light receiving surface conjugate image center position 112e. The straight line portion 112a and the straight line portion 112b are parallel with the straight line portion 112c and the straight line portion 112d, respectively. The light emitting surface conjugate image center position 111e coincides with the light receiving surface conjugate image center position 112e. Angles θb1 and θb2 formed between the straight line portions 112d and 112c and the Z direction in the traveling direction are about 45° and about 135°, respectively. From one side of the light receiving surface being 1 mm with the optical magnification $\beta_2=-1.4$, one side of the light receiving surface conjugate image 112 is calculated as 0.71 (1/1.4) mm.

Figure 7:
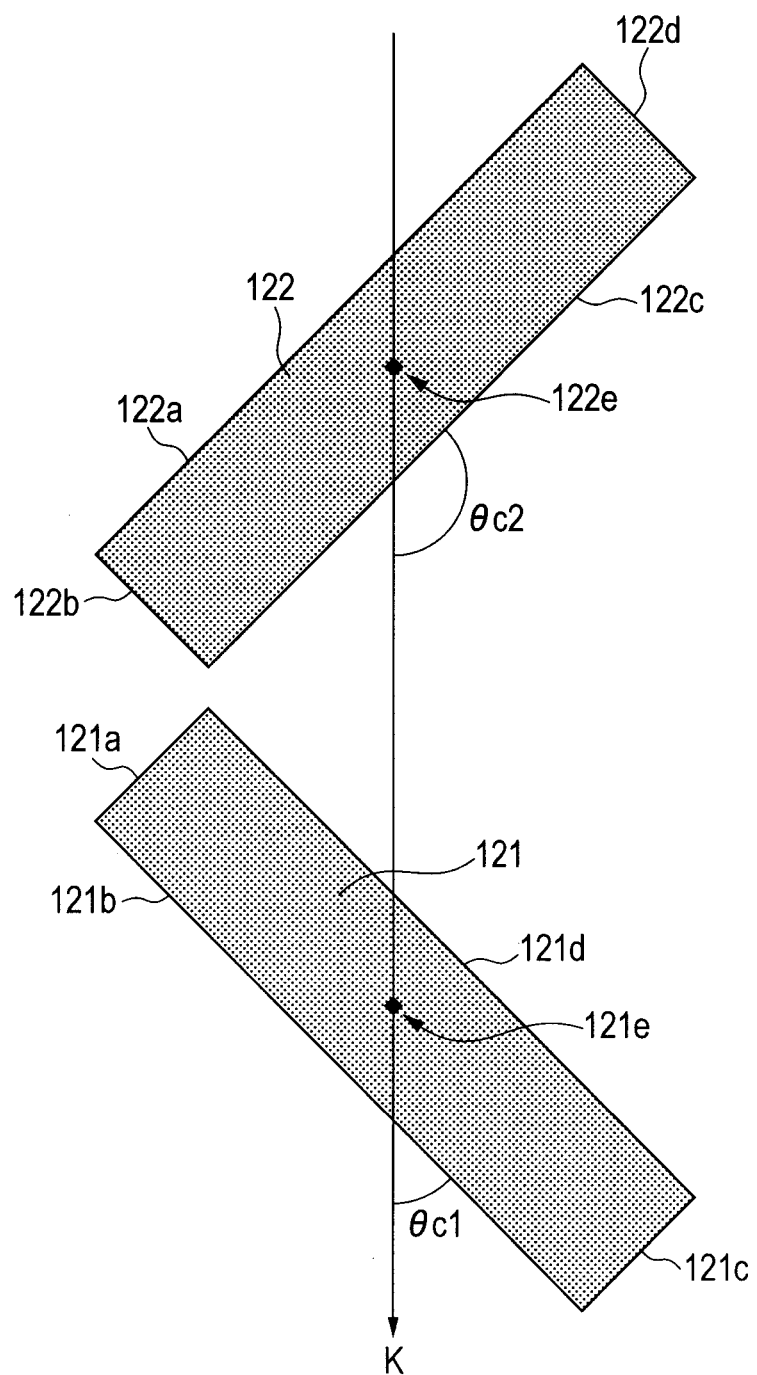
FIG. 7 is an explanatory diagram of pattern images (121 and 122).

FIG. 7 is an explanatory diagram of the pattern images 121 and 122 on the surface of the transferring belt 34. Each of the pattern images 121 and 122 is rectangular, and its widths 121b, 121d, 122a, and 122c in a long side direction are sufficiently longer than the widths of the light emitting surface conjugate image 111 and the light receiving surface conjugate image 112. The widths 121a, 121c, 122b, and 122d in a short side direction are substantially the same as the width of the light receiving surface conjugate image 112. There are two pattern images, that is, the pattern image 121, and the pattern image 122. The pattern image 121 includes four straight line portions 121a, 121b, 121c, and 121d, and a center position 121e. Further, the pattern image 122 includes four straight line portions 122a, 122b, 122c, and 122d, and a center position 122e. The straight line portion 121a is parallel with the straight line portion 121c, and the straight line portion 122a of the pattern image 122 is parallel with the straight line portion 122c. Angles θc1 and θc2 formed between the straight line portions 121b and 122c and the Z direction in the traveling direction are 45° and 135°, respectively. Therefore, the straight portions of the light emitting surface conjugate image 111, the straight portions of the light receiving surface conjugate image 112, and the straight portions of the pattern images 121 and 122 are substantially parallel with one another.

Figure 8:
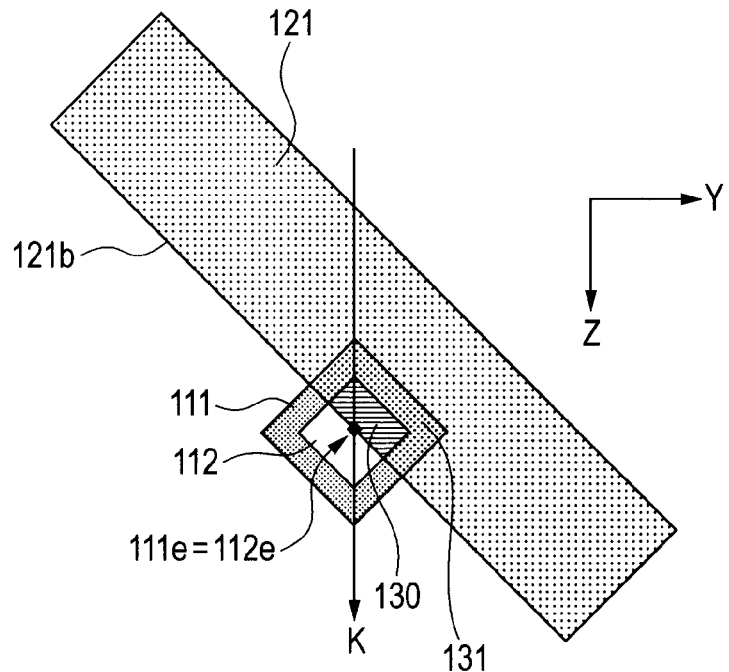
FIG. 8 is an explanatory diagram of the pattern image (121), the light emitting surface conjugate image (111), and the light receiving surface conjugate image (112) that are formed on the recording member in a case where a straight line portion of the pattern image (121) has reached a light receiving surface conjugate image center position (112e).

FIG. 8 is an explanatory diagram illustrating a relationship among the light emitting surface conjugate image 111, the light receiving surface conjugate image 112, and the pattern image 121 on the transferring belt 34 obtained when the straight line portion 121b of the pattern image 121 reaches the light receiving surface conjugate image center position 112e. When the transferring belt 34 conveys the pattern images 121 and 122, scattering light occurs in an overlapped region 131 between the pattern images 121 and 122 and the light emitting surface conjugate image 111. Of the scattering light, the light receiving element 36 receives the scattering light from an overlapped region 130 between the overlapped region 131 and the light receiving surface conjugate image 112. Here, the light emitting surface 31a emits light uniformly within the surface, and hence an illumination intensity distribution within the light emitting surface conjugate image 111 being the conjugate image of the light emitting surface 31a is also uniform. Further, the illumination intensity is extremely lowered outside the region of the light emitting surface conjugate image 111.

In the same manner, the sensitivity of the light receiving surface 36a is uniform within the light receiving surface, and hence a light receiving sensitivity distribution within the light receiving surface conjugate image 112 being the conjugate image of the light receiving surface 36a is also substantially uniform. Further, there is no light receiving sensitivity outside the region of the light receiving surface conjugate image 112. The word "substantially" is added here because the light receiving surface conjugate image 112 is substantially square as discussed above. In addition, the scattering by the pattern images 121 and 122 is substantially isotropic scattering, and hence the light intensity toward the light receiving surface 36a is substantially proportional to the area of the scattered region. As a result, the received light intensity is substantially proportional to the area of the overlapped region 130. As the pattern images 121 and 122 are conveyed, the area of the overlapped region 130 changes, thereby changing the received light intensity and generating a detection signal.

Before describing the image information detection apparatus of the present invention, the problems to be solved by the image information detection apparatus of the present invention are described by taking a system (Comparative Example 1) comparable with this example.

COMPARATIVE EXAMPLE 1

Figure 9:
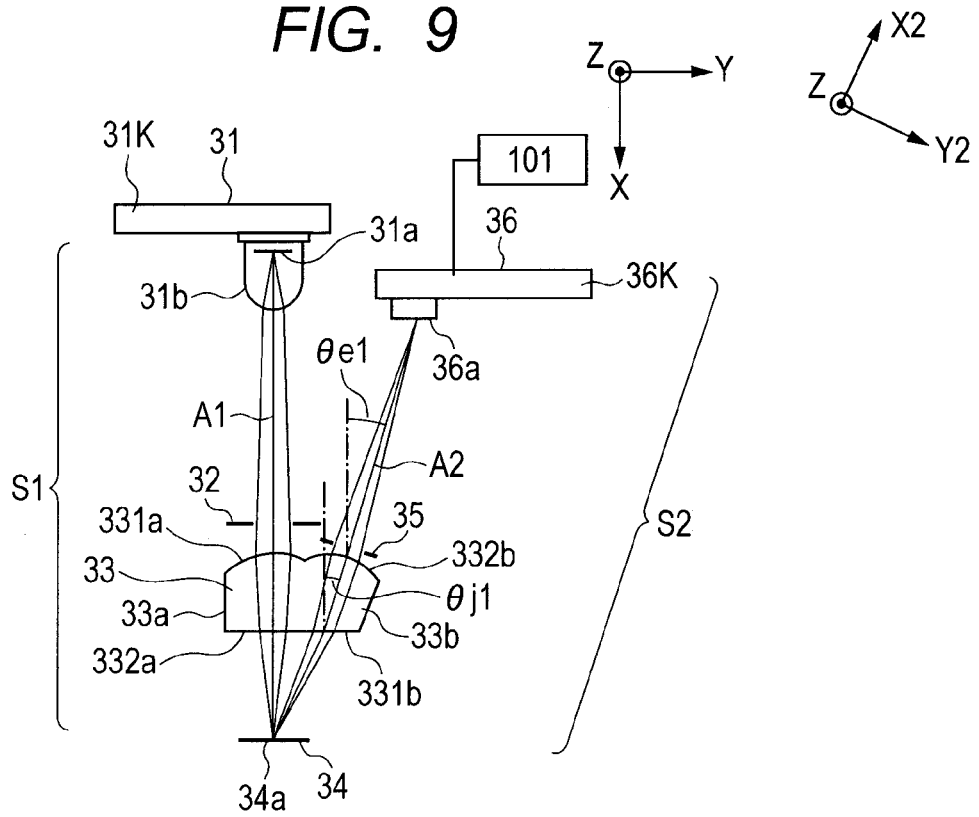
FIG. 9 is a sectional view of Comparative Example 1 of the present invention.
Figure 10:
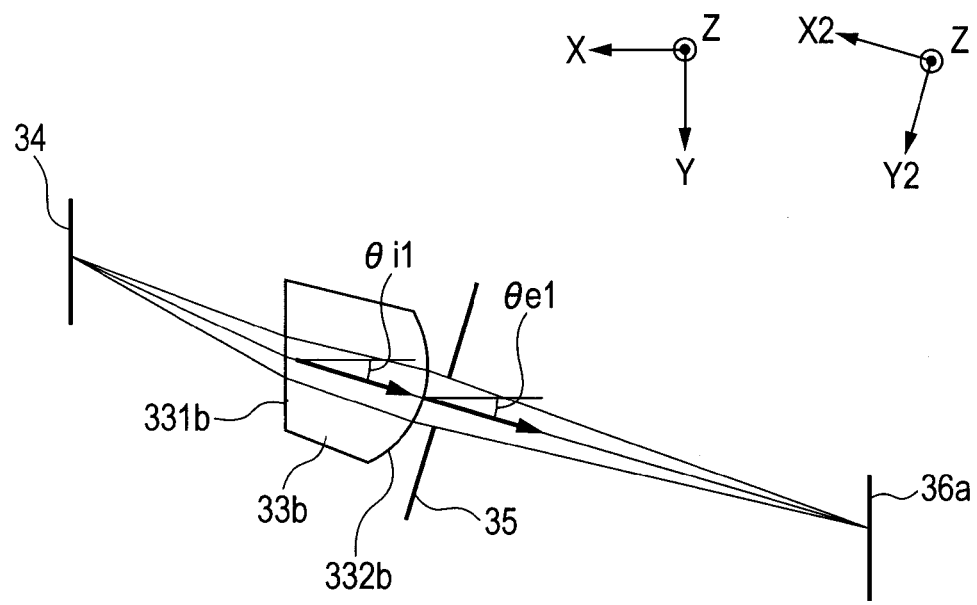
FIG. 10 is a sectional view of an imaging optical system according to Comparative Example 1.

FIG. 9 and FIG. 10 are explanatory diagrams of Comparative Example 1 corresponding to Example 1 of the present invention. FIG. 9 is a main scanning sectional view of an overall optical system of the image information detection apparatus. FIG. 10 is a main scanning sectional view of the imaging optical system according to Comparative Example 1. In FIG. 9 and FIG. 10, the same members as the members illustrated in FIG. 1 and FIGS. 2A to 2C are denoted by the same reference symbols.

In the present invention, in a range from the light source 31 (hereinafter, referred to as "light source 31 for irregular reflection") to a recording member 34 of the illumination optical system S1, the center ray in terms of intensity of the light beam exiting from the light source 31 for irregular reflection is defined as an illumination system principal ray A1. Further, in a range from the recording member 34 to the light receiving element 36 of the light receiving optical system S2, a ray passing through the center of the diaphragm 35 within the imaging optical system and entering the center of the light receiving unit is defined as an imaging system principal ray A2.

Of lens surfaces of the illumination lens 33a, the surface on the light source 31 side is defined as the lens surface 331a (hereinafter, referred to as "illumination lens R1 surface"), and the surface on the recording member 34 side is defined as the lens surface 332a (hereinafter, referred to as "illumination lens R2 surface"). Further, of the lens surfaces of the imaging lens 33b, the surface on the recording member 34 side is defined as the lens surface 331b (hereinafter, referred to as "imaging lens R1 surface"), and the surface on a light source unit side is defined as the lens surface 332b (hereinafter, referred to as "imaging lens R2 surface").

The illumination system principal ray A1 has a direction perpendicular to the recording member 34, and a lens surface normal of the illumination lens 33a is also perpendicular to the recording member 34 as well as the lens surfaces 331a and 332a.

The imaging system principal ray A2 is set to have an angle of 25° with respect to the X-axis immediately after being reflected by the recording member 34. After that, the imaging system principal ray A2 that has been refracted by the lens surface 331b has an angle of 16.5° with respect to the X-axis. Here, in the light receiving optical system S2, as indicated in FIG. 9, an X2-axis and a Y2-axis obtained by rotating the X-axis and the Y-axis, respectively, about the Z-axis clockwise on the drawing sheet by 16.5° (hereinafter, referred to as "(X2, Y2, and Z) coordinate system") are introduced in addition to the X-, Y-, and Z-axes.

Here, in both the (X, Y, and Z) coordinate system and the (X2, Y2, and Z) coordinate system, an intersection point of the recording member (recording medium) 34 and the illumination system principal ray A1 is set as an origin point. In Comparative Example 1, the lens surface 332b and the imaging system diaphragm 35 are set in a direction perpendicular to the X2-axis. Information related to the layout and surface shapes of the respective members according to Comparative Example 1 is shown in the following Table 1.

TABLE 1

Comparative Example 1

| | Surface vertex coordinates | | | Surface vertex normal direction cosine | | | Refractive index | Surface shape | | |
|---|---|---|---|---|---|---|---|---|---|---|
| | X | Y | Z | αx | αy | αz | (λ = 880 nm) | R | K | C4 |
| Light emitting point (31a) | −27.000 | 0.000 | 0 | 1.000 | 0.000 | 0 | 1.550 | ∞ | 0 | 0.0000 |
| Light source lens surface (31b) | −23.450 | 0.000 | 0 | 1.000 | 0.000 | 0 | 1.000 | ∞ | 0 | 0.0000 |
| Illumination lens R1 surface (331a) | −10.200 | 0.000 | 0 | 1.000 | 0.000 | 0 | 1.484 | 4.0 | 0 | 0.0000 |
| Illumination lens R2 surface (332a) | −6.000 | 0.000 | 0 | 1.000 | 0.000 | 0 | 1.000 | ∞ | 0 | 0.0000 |
| Recording medium surface (34) | 0.000 | 0.000 | 0 | 1.000 | 0.000 | 0 | 1.000 | ∞ | 0 | 0.0000 |
| Imaging lens R1 surface (331b) | −6.000 | 2.798 | 0 | 1.000 | 0.000 | 0 | 1.484 | ∞ | 0 | 0.0000 |
| Imaging lens R2 surface (332b) | −10.000 | 3.986 | 0 | 0.959 | −0.285 | 0 | 1.000 | −2.8868 | 0 | 0.0058 |
| Diaphragm (35) | −10.500 | 4.134 | 0 | 0.938 | −0.347 | 0 | 1.000 | ∞ | 0 | 0.0000 |
| Light receiving element surface (36a) | −23.000 | 7.850 | 0 | 1.000 | 0.000 | 0 | | ∞ | 0 | 0.0000 |

The (X, Y, and Z) coordinate system of FIG. 1 is used for the surface vertex coordinates and the surface vertex normal direction cosines of the respective surfaces shown in the above Table-1. Further, the surface shape is defined according to the following Expression 4.

$$x = \frac{h^2/R}{1 + \sqrt{1 - (1+k)(h/R)^2}} + C_4 h^4$$
$$h = \sqrt{y^2 + z^2}$$

(Expression 4)

Here, as x, y, and z in the above-mentioned mathematical expression, the (X, Y, and Z) coordinate system is used for the illumination optical system S1, and the (X2, Y2, and Z) coordinate system including the X2-axis parallel with the imaging system principal ray A2 is used for the light receiving optical system S2. In the expression, R represents a curvature radius, and k and $C_4$ each represent an aspheric coefficient. It is understood from the above mathematical expression that the illumination lens R1 surface (331a) is a spherical surface being rotationally symmetric about the X-axis, and the imaging lens R2 surface (332b) is an aspheric surface being rotationally symmetric about the X2-axis. Further, the illumination lens R2 surface (332a) and the imaging lens R1 surface (331b) each have a planar shape parallel with the recording member 34. Further, the following Table 2 shows ray passing coordinates of the principal ray on the respective surfaces.

TABLE 2

Comparative Example 1

| | Ray passing coordinates | | | Principal ray direction cosine | | | Exit angle |
|---|---|---|---|---|---|---|---|
| | X | Y | Z | αx' | αy' | αz' | θx |
| Light emitting point (31a) | −27.001 | 0.000 | 0 | 1.000 | 0.002 | 0 | −0.1 |
| Light source lens surface (31b) | −23.451 | 0.007 | 0 | 1.000 | 0.001 | 0 | 0.0 |
| Illumination lens R1 surface (331a) | −10.200 | 0.014 | 0 | 1.000 | −0.001 | 0 | 0.0 |

TABLE 2-continued

Comparative Example 1

| | Ray passing coordinates | | | Principal ray direction cosine | | | Exit angle |
|---|---|---|---|---|---|---|---|
| | X | Y | Z | αx' | αy' | αz' | θx |
| Illuminaton lens R2 surface (332a) | −6.001 | 0.010 | 0 | 1.000 | −0.001 | 0 | 0.1 |
| Recording medium surface (34) | 0.000 | 0.002 | 0 | −0.907 | 0.421 | 0 | 24.9 |
| Imaging lens R1 surface (331b) | −6.001 | 2.791 | 0 | −0.959 | 0.285 | 0 | 16.6 |
| Imaging lens R2 surface (332b) | −10.003 | 3.976 | 0 | −0.958 | 0.285 | 0 | 16.6 |
| Diaphragm (35) | −10.504 | 4.125 | 0 | −0.958 | 0.285 | 0 | 16.6 |
| Light receiving element surface (36a) | −23.001 | 7.843 | 0 | −0.958 | 0.285 | 0 | 16.6 |

As shown above, the imaging lens 33b is located in the following manner. That is, the incident angle (angle formed with respect to the surface normal of the recording member 34; the same shall apply hereinafter) to the imaging lens R1 surface (331b) is 24.9 (deg.). Further, an exit angle (angle formed with respect to the surface normal of the recording member 34; the same shall apply hereinafter) θi1 from the imaging lens R1 surface (331b) is 16.6 (deg.), and an exit angle θe1 from the imaging lens R2 surface (332b) is 16.6 (deg.). In other words, an angular difference θ1 (deg.) of the imaging system principal ray A2 before and after passing through the imaging lens R2 surface (332b) is defined as θ1=|θe1 (deg.)−θi1 (deg.)|, and θ1=0.0 (deg.).

Figure 11:
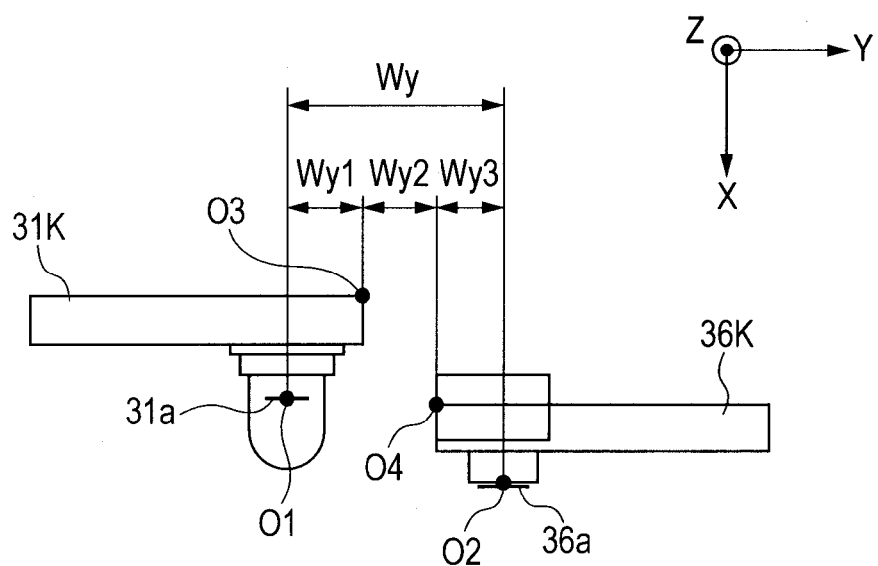
FIG. 11 is a schematic view of a layout of substrates.

FIG. 11 is a detailed view of a positional relationship between the light source substrate 31k for irregular reflection and the substrate 36k for a light receiving unit according to Comparative Example 1. As illustrated in FIG. 11, the center of the light emitting surface 31a is referred to as a point O1, the center of the light receiving surface 36a is referred to as a point O2, the closest point to the substrate 36k for a light receiving unit within the light source substrate 31k for irregular reflection is referred to as a point O3, and the closest point to the light source substrate 31k for irregular reflection within the substrate 36k for a light receiving unit is referred to as a point O4. Here, a Y-direction (main scanning direction) distance between the light emitting surface 31a of the light source 31 for irregular reflection and the light receiving surface 36a of the light receiving element 36 is set as Wy. In addition, by setting a Y-direction distance between the point O1 and the point O3 as Wy1, a Y-direction distance between the point O3 and the point O4 as Wy2, and a Y-direction distance between the point O2 and the point O4 as Wy3, the following relationship is established.

$$Wy = Wy1 + Wy2 + Wy3 \quad \text{(Expression 5)}$$

Further, this expression can be put another way as follows.

$$Wy2 = Wy - Wy1 - Wy3 \quad \text{(Expression 6)}$$

If the Y-direction distance Wy3 between the light source substrate 31k for irregular reflection and the substrate 36k for a light receiving unit assumes only a small value, there arises a problem in terms of layout, design, and ease of assembly. In this comparative example, Wy=7.65 (mm), Wy1=2.3 (mm), and Wy3=5.1 (mm). Therefore, as small a value as Wy2=0.25 (mm) is obtained from Expression 6.

Further, if the value of the distance Wy2 as a design value is small, in a case of assembling the unit of Comparative Example 1, a shift adjustment amount in the Y direction cannot be set large even when shift adjustment is performed on the substrate of at least one of the light source substrate 31k for irregular reflection and the substrate 36k for a light receiving unit. As a result, there may be a fear that the adjustment is insufficient compared to an ideal adjustment amount.

According to Example 1 of the present invention, in order to solve the above-mentioned problem, a countermeasure is taken against Comparative Example 1. In Example 1, the principal ray passing through the center of the diaphragm 35 within the imaging optical system and entering the center of the light receiving element 36 is defined as the imaging system principal ray A2. The imaging lens 33b being the light receiving optical element includes at least one optical plane for refracting an imaging system principal ray. The at least one optical plane of the imaging optical element is configured to refract the imaging system principal ray A2 after passing therethrough in a direction of becoming farther apart from the light source 31 than the imaging system principal ray A2 before passing through the optical plane. Next described is a specific configuration of Example 1.

EXAMPLE 1

FIG. 1 is referenced again to describe Example 1. As indicated in FIG. 1, the X2-axis and the Y2-axis are introduced for the light receiving optical system S2 in the same manner as in Comparative Example 1. Example 1 is different from Comparative Example 1 in that, compared to Comparative Example 1, the surface shape of the imaging lens R2 surface (332b) is shift-decentered by 0.39 mm in the positive direction of the Y2-axis, the entire light receiving element 36 is shift-moved by 0.95 mm in the positive direction of the Y-axis.

Figure 12:
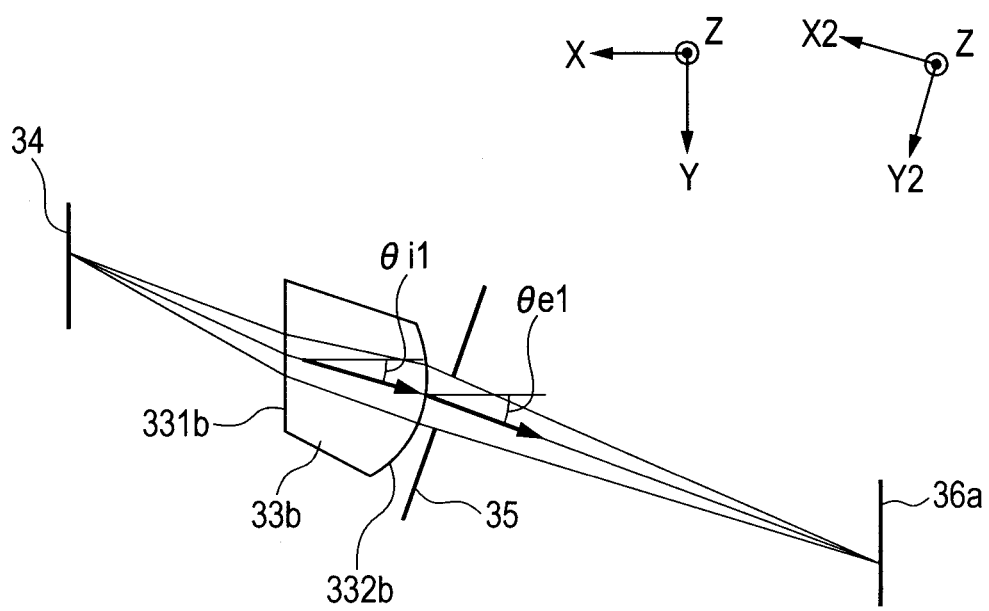
FIG. 12 is a sectional view of an imaging optical system according to Example 1.

FIG. 12 is a main scanning sectional view of the imaging optical system according to Example 1. Further, information related to the layout and surface shapes of the respective members is shown in the following Table 3. Further, the following Table 4 shows the ray passing coordinates of the principal ray on the respective surfaces.

TABLE 3

| | Surface vertex coordinates | | | Surface vertex normal direction cosine | | | Refractive index | Surface shape | | |
|---|---|---|---|---|---|---|---|---|---|---|
| | X | Y | Z | $\alpha x$ | $\alpha y$ | $\alpha z$ | ($\lambda$ = 880 nm) | R | K | C4 |
| Light emitting point (31a) | −27.000 | 0.000 | 0 | 1.000 | 0.000 | 0 | 1.550 | ∞ | 0 | 0.0000 |
| Light source lens surface (31b) | −23.450 | 0.000 | 0 | 1.000 | 0.000 | 0 | 1.000 | ∞ | 0 | 0.0000 |
| Illumination lens R1 surface (331a) | −10.200 | 0.000 | 0 | 1.000 | 0.000 | 0 | 1.484 | 3.7 | 0 | 0.0000 |
| Illumination lens R2 surface (332a) | −6.000 | 0.000 | 0 | 1.000 | 0.000 | 0 | 1.000 | ∞ | 0 | 0.0000 |
| Recording medium surface (34) | 0.000 | 0.000 | 0 | 1.000 | 0.000 | 0 | 1.000 | ∞ | 0 | 0.0000 |
| Imaging lens R1 surface (331b) | −6.000 | 2.798 | 0 | 1.000 | 0.000 | 0 | 1.484 | ∞ | 0 | 0.0000 |
| Imaging lens R2 surface (332b) | −9.889 | 4.360 | 0 | 0.959 | −0.285 | 0 | 1.000 | −2.8868 | 0 | 0.0058 |
| Diaphragm (35) | −10.500 | 4.171 | 0 | 0.938 | −0.347 | 0 | 1.000 | ∞ | 0 | 0.0000 |
| Light receiving element surface (36a) | −23.000 | 8.800 | 0 | 1.000 | 0.000 | 0 | | ∞ | 0 | 0.0000 |

TABLE 4

| | Ray passing coordinates | | | Principal ray direction cosine | | | Exit angle |
|---|---|---|---|---|---|---|---|
| | X | Y | Z | $\alpha x'$ | $\alpha y'$ | $\alpha z'$ | $\theta x$ |
| Light emitting point (31a) | −27.001 | 0.000 | 0 | 1.000 | 0.006 | 0 | −0.3 |
| Light source lens surface (31b) | −23.452 | 0.020 | 0 | 1.000 | 0.001 | 0 | −0.1 |
| Illumination lens R1 surface (331a) | −10.201 | 0.039 | 0 | 1.000 | −0.002 | 0 | 0.1 |

TABLE 4-continued

Example 1

|  | Ray passing coordinates | | | Principal ray direction cosine | | | Exit angle |
| --- | --- | --- | --- | --- | --- | --- | --- |
|  | X | Y | Z | αx' | αy' | αz' | θx |
| Illumination lens R2 surface (332a) | −6.001 | 0.029 | 0 | 1.000 | −0.004 | 0 | 0.2 |
| Recording medium surface (34) | 0.000 | 0.007 | 0 | −0.908 | 0.419 | 0 | 24.8 |
| Imaging lens R1 surface (331b) | −6.001 | 2.778 | 0 | −0.959 | 0.282 | 0 | 16.4 |
| Imaging lens R2 surface (332b) | −9.980 | 3.950 | 0 | −0.937 | 0.348 | 0 | 20.4 |
| Diaphragm (35) | −10.510 | 4.147 | 0 | −0.937 | 0.348 | 0 | 20.4 |
| Light receiving element surface (36a) | −23.001 | 8.789 | 0 | −0.937 | 0.348 | 0 | 20.4 |

As shown above, the imaging lens 33b is located in the following manner. That is, the incident angle to the imaging lens R1 surface (331b) is 24.8 (deg.), and the exit angle (angle formed between the principal ray before the passing and the surface normal of the recording member 34 according to the present invention) θi1 from the imaging lens R1 surface (331b) is 16.4 (deg.). Further, the exit angle (angle between the principal ray after the passing and the surface normal of the recording member 34 according to the present invention) θe1 from the imaging lens R2 surface (332b) is 20.4 (deg.). In other words, the angular difference θ1 (deg.) of the imaging system principal ray A2 before and after passing through the imaging lens R2 surface (332b) is defined as θ1=|θe1 (deg.)−θi1 (deg.)|, and θ1=4.0 (deg.). Further, compared to Comparative Example 1, the angular difference θ1 of the exit angle from the imaging lens R2 surface (332b) is increased by 4.0 (deg.).

As a result, the positional relationship between the light source substrate 31k for irregular reflection and the substrate 36k for a light receiving unit according to Example 1 is Wy=8.6 (mm), Wy1=2.3 (mm), and Wy3=5.1 (mm), and the distance Wy2=1.2 (mm) is obtained from Expression 6. As a result, compared to Comparative Example 1, the value of the distance Wy2 can be increased by 0.95 mm.

Broadly speaking, in Example 1, compared to Comparative Example 1, the imaging lens R2 surface (332b) is shifted by 0.39 mm in the positive direction of the Y2-axis, thereby increasing the exit angle from the imaging lens R2 surface (332b) by 4.0 (deg.).

As a result, the distance Wy2 between the light source substrate 31k for irregular reflection and the substrate 36k for a light receiving unit can be increased by 0.95 mm. As a result, large space between the substrates or between supporting members that support the substrates are generated, and the shift adjustment amount of the light source 31 or the light receiving element 36 can be set larger, which allows assembly adjustment to be performed with higher precision. In addition, large space between the two substrates 31k and 36k can be obtained, which is also advantageous in improving workability of assembly.

In Example 1, a surface vertex of the imaging lens R2 surface (332b) is shifted in the positive direction of the Y2-axis with respect to the imaging system principal ray A2 passing through the center of the diaphragm 35. Accordingly, the imaging system principal ray A2 being the principal ray exiting from the imaging lens R2 surface (332b) is bent at an angle larger by 4.0 (deg.) than in Comparative Example 1, but the same effect can be obtained even when the imaging lens R2 surface (332b) is decentered in a tilted (inclined) direction.

To put the above description another way, in the case of Comparative Example 1 where the surface normal at a point at which the optical plane having a curvature of the imaging lens 33b and the imaging system principal ray A2 intersect each other is parallel with the imaging system principal ray A2 after passing through the optical plane, the principal ray is not bent before and after passing through the optical plane.

On the other hand, in Example 1, the imaging lens 33b is optically located in such a manner that the shift-decentering at the lens surface and tilt-decentering at the lens surface are performed. In this case, the surface normal at the point at which the optical plane having the curvature of the imaging lens 33b and the imaging system principal ray A2 intersect each other is non-parallel with the imaging system principal ray A2 after passing through the optical plane. Accordingly, the principal ray exiting from the optical plane can be bent, and the light source substrate 31k and the substrate 36k for a light receiving unit can be spaced farther apart. At this time, it is desired that the angular difference θ1 (deg.) of the imaging system principal ray A2 before and after passing through the imaging lens R2 surface (332b) satisfy the following condition.

$$0 \text{ (deg.)} < \theta1 \text{(deg.)} \leq 15 \text{(deg.)} \quad \text{(Expression 7)}$$

The lower limit value of the above-mentioned condition is an obvious numerical value because the optical path is bent. Further, the upper limit value indicates an amount in which allowance is made for deterioration in optical aberration exhibited by the fact that the principal ray does not pass through a vertex of the lens surface and for a bending angle within such a range that the entire apparatus does not become too large.

In this example, θ1 (deg.)=4.0 (deg.), which satisfies Expression 7. In Example 1, the imaging lens R2 surface (332b) having a curvature is shift-decentered, but the present invention is not limited thereto. For example, the imaging lens R1 surface (331b) having a curvature may be shift-decentered or tilt-decentered. Alternatively, both the imaging lens R1 surface (331b) having a curvature and the imaging lens R2 surface (332b) having a curvature may be shift-decentered or tilt-decentered. Further, if the lens surface is tilt-decentered, even a planar shape having no curvature can produce the same effect.

Note that in Example 1, the lens R2 surface for irregular reflection illumination (332a) and the imaging lens R1 surface (331b) are set to have a planar shape. This is because cleaning is easily performed on the lens R2 surface for irregular reflection illumination (332a) and the imaging lens R1 surface (331b) that serve as a front surface portion of a detecting unit and are likely to be subject to toner stain. Further, in Example 1, the recording member (transferring belt) 34 is set as a flat-shaped member, but the present invention is not limited thereto, and the same effect can also be obtained by using a member having a curved surface shape. A possible example of having a curved surface shape is a case where the optical system is located above a roller that supports the recording member. In that case, a flapping amount of the recording member (transferring belt) can be suppressed to a low level to thereby increase detection precision.

EXAMPLE 2

An image information detection apparatus according to Example 2 of the present invention includes a system for detecting the density (reflected light intensity) of the pattern image by using the light beam obtained by regularly reflecting image information on the pattern image for position detection related to the layout and surface shapes of the respective members according to Comparative Example 2 is shown in the following Table 5.

TABLE 5

| | Comparative Example 2 | | | | | | | | | |
|---|---|---|---|---|---|---|---|---|---|---|
| | Surface vertex coordinates | | | Surface vertex normal direction cosine | | | Refractive index | Surface shape | | |
| | X | Y | Z | αx | αy | αz | (λ = 880 nm) | R | K | C4 |
| Light emitting point (41a) | −18.000 | −6.362 | 0 | 0.959 | 0.285 | 0 | 1.550 | ∞ | 0 | 0.0000 |
| Light source lens surface (41b) | −14.597 | −5.351 | 0 | 0.959 | 0.285 | 0 | 1.000 | ∞ | 0 | 0.0000 |
| Illumination lens R1 surface (331c) | −10.000 | −3.986 | 0 | 0.959 | 0.285 | 0 | 1.484 | 4.0 | 0 | 0.0000 |
| Illumination lens R2 surface (332c) | −6.000 | −2.798 | 0 | 1.000 | 0.000 | 0 | 1.000 | ∞ | 0 | 0.0000 |
| Recording medium surface (34) | 0.000 | 0.000 | 0 | 1.000 | 0.000 | 0 | 1.000 | ∞ | 0 | 0.0000 |
| Imaging lens R1 surface (331b) | −6.000 | 2.798 | 0 | 1.000 | 0.000 | 0 | 1.484 | ∞ | 0 | 0.0000 |
| Imaging lens R2 surface (332b) | −9.889 | 4.360 | 0 | 0.959 | −0.285 | 0 | 1.000 | −2.8868 | 0 | 0.0058 |
| Diaphragm (35) | −10.500 | 4.171 | 0 | 0.938 | −0.347 | 0 | 1.000 | ∞ | 0 | 0.0000 |
| Light receiving element surface (36a) | −23.000 | 8.800 | 0 | 1.000 | 0.000 | 0 | | ∞ | 0 | 0.0000 | formed on the transferring belt 34 with respect to the incident light beam and a system for detecting a color misregistration (position information) by using scattered light (irregularly reflected light). One or both thereof are used as necessary to detect the image information on the pattern image. In the same manner as in Example 1, a system to be compared with Example 2 is taken to describe the problem to be solved by the present invention.

COMPARATIVE EXAMPLE 2

Figure 13:
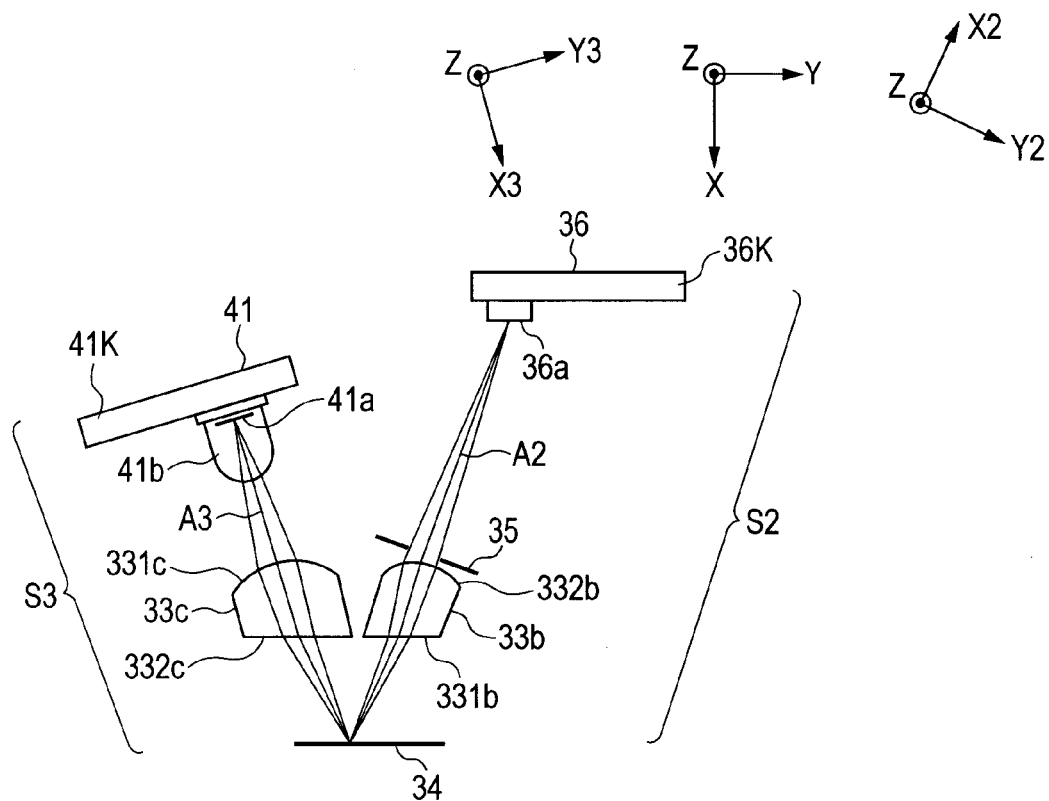
FIG. 13 is a sectional view of Comparative Example 2 of the present invention.

FIG. 13 is a schematic view of a main portion of Comparative Example 2 corresponding to Example 2 of the present invention. FIG. 13 is a main scanning sectional view of the overall optical system of the image information detection apparatus. Here, the imaging optical system is configured to have the same layout as in Example 1 illustrated in FIG. 12, and hence description thereof is omitted.

FIG. 13 illustrates an illumination optical system S3 in a range from the light source 41 (hereinafter, referred to as "light source 41 for regular reflection") to a recording member 34. In the illumination optical system S3, the center ray in terms of intensity of the light beam exiting from the light source 41 for regular reflection is defined as an illumination system principal ray A3. Further, as in Example 1, in a range from the recording member 34 to the light receiving element 36 of the light receiving optical system S2, a ray passing through the center of the diaphragm 35 within the imaging optical system and entering the center of the light receiving unit 36 is defined as an imaging system principal ray A2. The illumination system principal ray A3 is regularly reflected by the recording member 34 to become the imaging system principal ray A2.

Of lens surfaces of the illumination lens 33c, the surface on the light source 41 side is defined as the lens surface 331c (hereinafter, referred to as "illumination lens R1 surface"), and the surface on the recording member 34 side is defined as the lens surface 332c (hereinafter, referred to as "illumination lens R2 surface"). Further, the lens surfaces of the imaging lens 33b are denoted similarly as in Example 1. Information An illumination optical system S3 is laid out in the following manner. That is, the incident angle to the recording member 34 is 16.5 (deg.) in a range from the light source 41 for regular reflection to a illumination lens R1 surface (331c). Further, the incident angle to the recording member 34 is 25 (deg.) in a range after being refracted by a illumination lens R2 surface (332c) being a flat-shaped portion. The configuration of the light receiving optical system S2 is the same as Example 1.

Here, in the illumination optical system S3, as indicated in FIG. 13, an X3-axis and a Y3-axis obtained by rotating the X-axis and the Y-axis, respectively, about the Z-axis counterclockwise on the drawing sheet by 16.5° (hereinafter, referred to as "(X3, Y3, and Z) coordinate system") are introduced in addition to the X-, Y-, and Z-axes. In the (X3, Y3, and Z) coordinate system, an intersection point of the recording member (recording medium) 34 and the imaging system principal ray A2 is set as an origin point.

In Comparative Example 2, the light source 41 for regular reflection and the illumination lens R1 surface (331c) are set in a direction perpendicular to the X3-axis. The (X, Y, and Z) coordinate system of FIG. 13 is used for the surface vertex coordinates and the surface vertex normal direction cosines of the respective surfaces shown in the above-mentioned Table-5. Further, the surface shape is defined according to Expression 5 described above. Here, as x, y, and z in Expression 5, the (X3, Y3, and Z) coordinate system is used for the illumination optical system S3, and the (X2, Y2, and Z) coordinate system including the X2-axis parallel with the imaging system principal ray A2 is used for the light receiving optical system S2. In the expression, R represents the curvature radius, and k and $C_4$ each represent the aspheric coefficient. It is understood from the above-mentioned mathematical expression that the illumination lens R1 surface (331c) is a spherical surface being rotationally symmetric about the X3-axis, and the imaging lens R2 surface (332b) is an aspheric surface being rotationally symmetric about the X2-axis. Further, the illumination lens R2 surface (332c) and the imaging lens R1 surface (331b) each have a planar shape parallel with the recording member 34. Further, the following Table 6 shows the ray passing coordinates of the principal ray on the respective surfaces according to Comparative Example 2.

TABLE 6

Comparative Example 2

|  | Ray passing coordinates | | | Principal ray direction cosine | | | Exit angle |
| --- | --- | --- | --- | --- | --- | --- | --- |
|  | X | Y | Z | αx' | αy' | αz' | θx |
| Light emitting point (41a) | −18.000 | −6.362 | 0 | 0.953 | 0.289 | 0 | −16.8 |
| Light source lens surface (41b) | −14.616 | −5.290 | 0 | 0.957 | 0.289 | 0 | −16.8 |
| Illumination lens R1 surface (331c) | −10.024 | −3.903 | 0 | 0.960 | 0.289 | 0 | −16.8 |
| Illumination lens R2 surface (332c) | −6.000 | −2.725 | 0 | 0.909 | 0.417 | 0 | −24.7 |
| Recording medium surface (34) | 0.000 | 0.028 | 0 | −0.909 | 0.417 | 0 | 24.7 |
| Imaging lens R1 surface (331b) | −6.000 | 2.781 | 0 | −0.960 | 0.281 | 0 | 16.3 |
| Imaging lens R2 surface (332b) | −9.979 | 3.946 | 0 | −0.938 | 0.347 | 0 | 20.3 |
| Diaphragm (35) | −10.510 | 4.143 | 0 | −0.938 | 0.347 | 0 | 20.3 |
| Light receiving element surface (36a) | −23.000 | 8.760 | 0 | −0.938 | 0.347 | 0 | 20.3 |

As shown above, the illumination lens 33c is located in the following manner. That is, the incident angle θi2 to the regular reflection illumination lens R1 surface (331c) is 16.8 (deg.), and the exit angle θe2 from the regular reflection illumination lens R1 surface (331c) is 16.8 (deg.). Further, the exit angle from the regular reflection illumination lens R2 surface (332c) is 24.7 (deg.). Further, the imaging lens 33b is located in the following manner. That is, the incident angle to the imaging lens R1 surface (331b) is 24.7 (deg.), the exit angle from the imaging lens R1 surface (331b) is 16.3 (deg.), and the exit angle from the imaging lens R2 surface (332b) is 20.3 (deg.). In other words, an angular difference θ2 (deg.) of the imaging system principal ray before and after passing through the illumination lens R1 surface (331c) is defined as θ2=|θe2 (deg.)−θi2 (deg.)|, and θ2=0.0 (deg.).

Figure 14:
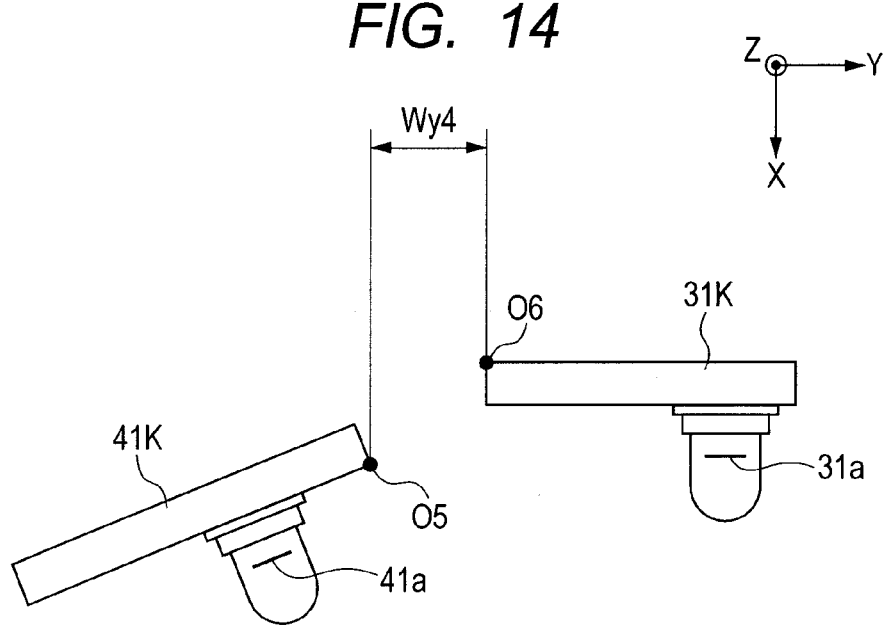
FIG. 14 is a schematic view of the layout of the substrates.

FIG. 14 is an explanatory view of details of the positional relationship between a light source substrate 41k for regular reflection and the light source substrate 31k for irregular reflection. As illustrated in FIG. 14, the closest point to the light source substrate 31k for irregular reflection within the light source substrate 41k for regular reflection is referred to as a point O5, and the closest point to the light source substrate 41k for regular reflection within the light source substrate 31k for irregular reflection is referred to as a point O6. The Y-direction distance between the point O5 and the point O6 is set as Wy4. If the distance Wy4 being the Y-direction distance between the light source substrate 41k for regular reflection and the light source substrate 31k for irregular reflection assumes only a small value, there arises a problem in terms of layout, design, and ease of assembly. In this comparative example, the value of the distance is as small as Wy4=0.2 (mm).

Further, the value of the distance Wy2 as a design value is small, and hence in a case of assembling the unit of Comparative Example 2, the following drawback arises. That is, the shift adjustment amount in the Y direction cannot be set large even when the shift adjustment is performed on at least one of the light source substrate 41k for regular reflection and the light source substrate 31k for irregular reflection, and hence, there may be a fear that the adjustment is insufficient compared to an ideal adjustment amount.

EXAMPLE 2

In order to solve the above-mentioned problem, Example 2 of the present invention obtained by taking a countermeasure against Comparative Example 2 is described below. In Example 2, a central ray of the light beam exiting from a light source unit 41 is defined as an illumination system principal ray A3. An illumination lens (illumination optical element) 33c includes at least one optical plane for refracting an illumination system principal ray. The at least one optical plane of the illumination optical element is configured so that the illumination system principal ray before passing therethrough enters the illumination optical element in a direction of becoming farther apart from the light receiving element 36 than the illumination system principal ray A3 after passing through the optical plane.

Also in this example, in the same manner as in Comparative Example 2 illustrated in FIG. 14, the light source substrate 31k for irregular reflection for detecting the color misregistration and the light source substrate 41k for regular reflection for detecting the density (reflected light intensity) of the pattern image are provided and used as necessary. Note that the color misregistration (position information) may be detected by using the light beam emitted from the light source substrate 41k for regular reflection.

Figure 15:
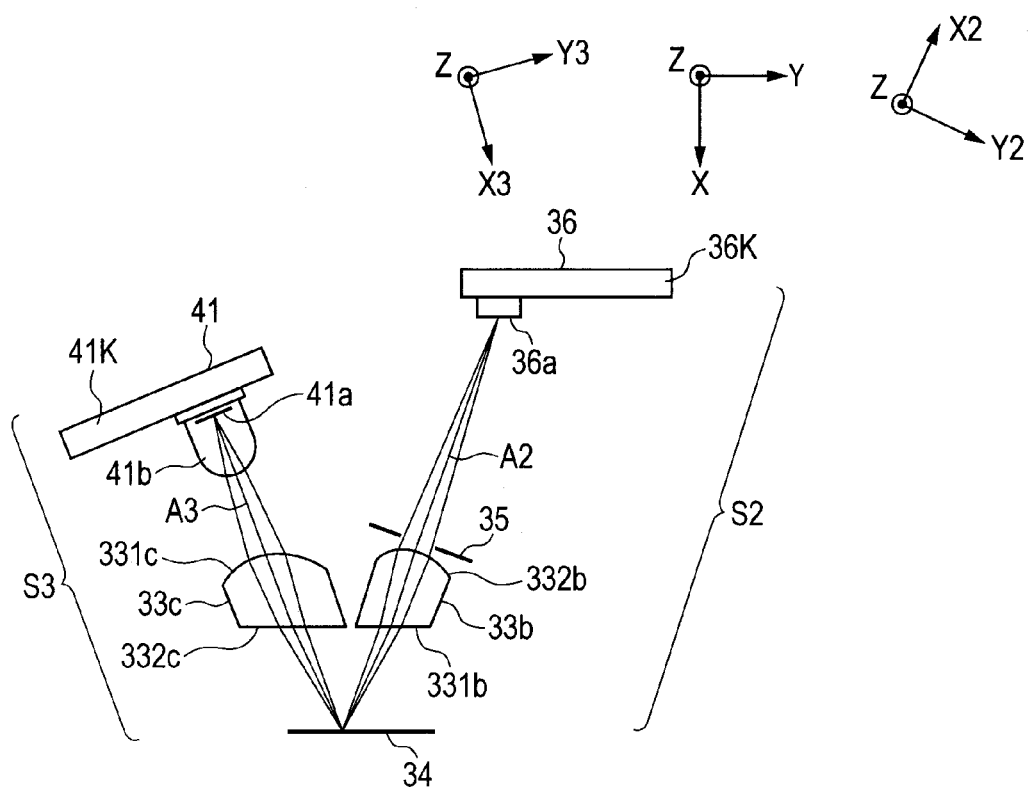
FIG. 15 is a sectional view of a main portion of Example 2 of the present invention.

FIG. 15 is a schematic view of a main portion of Example 2 of the present invention. FIG. 15 illustrates only the light source substrate 41k for regular reflection, but in the same manner as FIG. 14, the light source substrate 31k for irregular reflection is provided. In Example 2 illustrated in FIG. 15, the X3-axis and the Y3-axis are introduced for the illumination optical system S3, and the X2-axis and the Y2-axis are introduced for the light receiving optical system S2.

In this example, the surface shape of the illumination lens R1 surface (331c) of the illumination lens 33c is tilt-decentered by 10.8 (deg.) in a direction from the Y3-axis toward the X3-axis, and the entire light source unit 41 is shift-moved by 0.8 mm toward the negative direction of the Y-axis. Information related to the layout and surface shapes of the respective members according to Example 2 is shown in the following Table 7. Further, the following Table 8 shows the ray passing coordinates of the principal ray on the respective surfaces.

TABLE 7

Example 2

|  | Surface vertex coordinates | | | Surface vertex normal direction cosine | | | Refractive index | Surface shape | | |
| --- | --- | --- | --- | --- | --- | --- | --- | --- | --- | --- |
|  | X | Y | Z | αx | αy | αz | (λ = 880 nm) | R | K | C4 |
| Light emitting point (41a) | −18.000 | −7.200 | 0 | 0.928 | 0.373 | 0 | 1.550 | ∞ | 0 | 0.0000 |
| Light source lens surface (41b) | −14.706 | −5.877 | 0 | 0.928 | 0.373 | 0 | 1.000 | ∞ | 0 | 0.0000 |

TABLE 7-continued

Example 2

| | Surface vertex coordinates | | | Surface vertex normal direction cosine | | | Refractive index | Surface shape | | |
|---|---|---|---|---|---|---|---|---|---|---|
| | X | Y | Z | αx | αy | αz | (λ = 880 nm) | R | K | C4 |
| Illumination lens R1 surface (331c) | −10.000 | −3.986 | 0 | 0.995 | 0.100 | 0 | 1.484 | 4.0 | 0 | 0.0000 |
| Illumination lens R2 surface (332c) | −6.000 | −2.798 | 0 | 1.000 | 0.000 | 0 | 1.000 | ∞ | 0 | 0.0000 |
| Recording medium surface (34) | 0.000 | 0.000 | 0 | 1.000 | 0.000 | 0 | 1.000 | ∞ | 0 | 0.0000 |
| Imaging lens R1 surface (331b) | −6.000 | 2.798 | 0 | 1.000 | 0.000 | 0 | 1.484 | ∞ | 0 | 0.0000 |
| Imaging lens R2 surface (332b) | −9.889 | 4.360 | 0 | 0.959 | −0.285 | 0 | 1.000 | −2.8868 | 0 | 0.0058 |
| Diaphragm (35) | −10.500 | 4.171 | 0 | 0.938 | −0.347 | 0 | 1.000 | ∞ | 0 | 0.0000 |
| Light receiving element surface (36a) | −23.000 | 8.800 | 0 | 1.000 | 0.000 | 0 | | ∞ | 0 | 0.0000 |

TABLE 8

Example 2

| | Ray passing coordinates | | | Principal ray direction cosine | | | Exit angle |
|---|---|---|---|---|---|---|---|
| | X | Y | Z | αx' | αy' | αz' | θx |
| Light emitting point (41a) | −18.000 | −7.200 | 0 | 0.941 | 0.338 | 0 | −19.8 |
| Light source lens surface (41b) | −14.662 | −6.001 | 0 | 0.931 | 0.364 | 0 | −21.3 |
| Illumination lens R1 surface (331c) | −9.977 | −4.170 | 0 | 0.956 | 0.294 | 0 | −17.1 |
| Illumination lens R2 surface (332c) | −6.000 | −2.948 | 0 | 0.900 | 0.436 | 0 | −25.8 |
| Recording medium surface (34) | 0.000 | −0.041 | 0 | −0.900 | 0.436 | 0 | 25.8 |
| Imaging lens R1 surface (331b) | −6.000 | 2.866 | 0 | −0.956 | 0.294 | 0 | 17.1 |
| Imaging lens R2 surface (332b) | −9.957 | 4.082 | 0 | −0.939 | 0.344 | 0 | 20.1 |
| Diaphragm (35) | −10.464 | 4.267 | 0 | −0.939 | 0.344 | 0 | 20.1 |
| Light receiving element surface (36a) | −23.000 | 8.857 | 0 | −0.939 | 0.344 | 0 | 20.1 |

As shown above, the illumination lens 33c is located in the following manner. That is, the incident angle θi2 to the regular reflection illumination lens R1 surface (331c) is set to 21.3 (deg.). Further, the exit angle θe2 from the regular reflection illumination lens R1 surface (331c) is 17.1 (deg.), and the exit angle from the regular reflection illumination lens R2 surface (332c) is 25.8 (deg.).

Further, the imaging lens 33b is located in the following manner. That is, the incident angle to the imaging lens R1 surface (331b) is 25.8 (deg.), and the exit angle from the imaging lens R1 surface (331b) is 17.1 (deg.), and the exit angle from the imaging lens R2 surface (332b) is 20.1 (deg.).

In other words, an angular difference θ2 (deg.) of the illumination system principal ray before and after passing through the regular reflection illumination lens R1 surface (331c) is defined as θ2=|θe2 (deg.)−θi3 (deg.)|, and θ2=|17.1°−21.3°|. That is, θ2=4.2 (deg.).

Compared to Comparative Example 2, the incident angle to the regular reflection illumination lens R1 surface (331c) is θb3=21.3° in Example 2 and θb3=16.8° in Comparative Example 2, and hence the incident angle is increased by 4.5° (deg.).

As a result, the positional relationship between the light source substrate 41k for regular reflection and the light source substrate 31k for irregular reflection according to Example 2 is the distance Wy4=1.0 (mm), and hence, compared to Comparative Example 2, it is possible to increase the value of 0.2 of the distance Wy4 by 0.8 mm.

In summary, in Example 2, compared to Comparative Example 2, the surface shape of the regular reflection illumination lens R1 surface (331c) is tilt-decentered by 10.8 (deg.) in a direction from the Y3-axis toward the X3-axis. Accordingly, the incident angle to the regular reflection illumination lens R1 surface (331c) has increased by 4.5 (deg.), and the distance Wy4 between the light source substrate 41k for regular reflection and the light source substrate 31k for irregular reflection illustrated in FIG. 1 can be increased by 0.8 mm.

As a result, large space between the substrates 41k and 36k or between the supporting members that support the substrates is generated, and the shift adjustment amount of the light source unit for regular reflection or the light source unit for irregular reflection can be set larger, which allows the assembly adjustment to be performed with higher precision. In addition, large space between the two substrates is obtained, which is also advantageous in improved workability of assembly.

In Example 2, the surface shape of the regular reflection illumination lens R1 surface (331c) is tilt-decentered by 10.8 (deg.) in a direction from the Y3-axis toward the X3-axis. Accordingly, the incident angle to the regular reflection illumination lens R1 surface (331c) is bent at an angle larger by 4.5 (deg.) than in Comparative Example 2. In Example 2, the same effect can be obtained even when the regular reflection illumination lens R1 surface (331c) is decentered in a shift direction (Y3 direction) as performed in Example 1.

To put the above description another way, in the case of Comparative Example 2, where the surface normal at a point at which the optical plane having a curvature of the illumination optical element and the illumination system principal ray intersect each other is parallel with the illumination system principal ray after passing through the optical plane, the principal ray is not bent before and after passing through the optical plane.

On the other hand, in the case of performing the tilt-decentering at the lens surface and the shift-decentering at the lens surface as described in Example 2, the illumination lens 33c is located in the following manner. That is, the surface normal at the point at which the optical plane having a curvature of the illumination optical element and the illumination system principal ray intersect each other is non-parallel with the illumination system principal ray after passing through the optical plane. Accordingly, the principal ray exiting from the optical plane can be bent, and the light source substrate 41k for regular reflection can be spaced farther apart than the light source substrate 31k for irregular reflection of FIG. 1.

At this time, it is desired that the angular difference θ2 (deg.) of the illumination system principal ray before and after passing through the regular reflection illumination lens R1 surface (331c) satisfy the following condition.

$$0(\text{deg.}) < \theta2(\text{deg.}) \leq 15(\text{deg.}) \quad \text{(Expression 8)}$$

The lower limit value of the above-mentioned condition is an obvious numerical value because the optical path is bent. Further, the upper limit value indicates an amount in which allowance is made for deterioration in optical aberration exhibited by the fact that an incident ray does not perpendicularly enter the lens surface and for the bending angle within such a range that the entire apparatus does not become too large.

In this example, the angular difference θ2 (deg.)=4.2 (deg.), which satisfies Expression 8.

In Example 2, the regular reflection illumination lens R1 surface (331c) having a curvature is tilt-decentered, but the present invention is not limited thereto, and the regular reflection illumination lens R2 surface (332c) may be configured to have a curvature and may be shift-decentered or tilt-decentered. In addition, both the regular reflection illumination lens R1 surface (331c) having a curvature and the regular reflection illumination lens R2 surface (332c) may be shift-decentered or tilt-decentered.

In addition, in Example 2, by the fact that the imaging lens R2 surface (332b) is shift-decentered or tilt-decentered in the positive direction of the Y2-axis, the exit angle from the imaging lens R2 surface (332b) may be increased.

That is, within a main scanning section, the imaging lens 33b includes the imaging lens R2 surface (332b) for causing the principal ray of the light beam that has been reflected by the surface of the image bearing member and is to enter the light receiving surface 36a to bend in a direction of becoming apart from the light source unit 41.

Further, if the lens surface is tilt-decentered, even a planar shape having no curvature can produce the same effect.

Note that in Example 2, the regular reflection illumination lens R2 surface (332c) and the imaging lens R1 surface (331b) are configured to have a planar shape. This is because, in the same manner as in Example 1, such an advantage is taken into consideration that cleaning is easily performed on the regular reflection illumination lens R2 surface (332c) and the imaging lens R1 surface (331b) that serve as the front surface portion of the detecting unit and are likely to be subject to toner stain.

Further, in Example 2, the recording member (transferring belt) 34 is set as a flat-shaped member, but the present invention is not limited thereto, and the same effect can also be obtained by using a member having a curved surface shape. A possible example of having a curved surface shape is the case where the optical system is located above the roller that supports the recording member, and in that case, the flapping amount of the recording member (transferring belt) can be suppressed to a low level to produce an advantage of the increase in detection precision.

As described above, according to each of the examples, large space between the substrates or between the supporting members that support the substrates is generated, and the shift adjustment amount of the light source unit or the light receiving unit can be set larger, which allows the assembly adjustment to be performed with higher precision. Further, large space between the substrates is obtained, which is advantageous in improved workability of assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Figure 16:
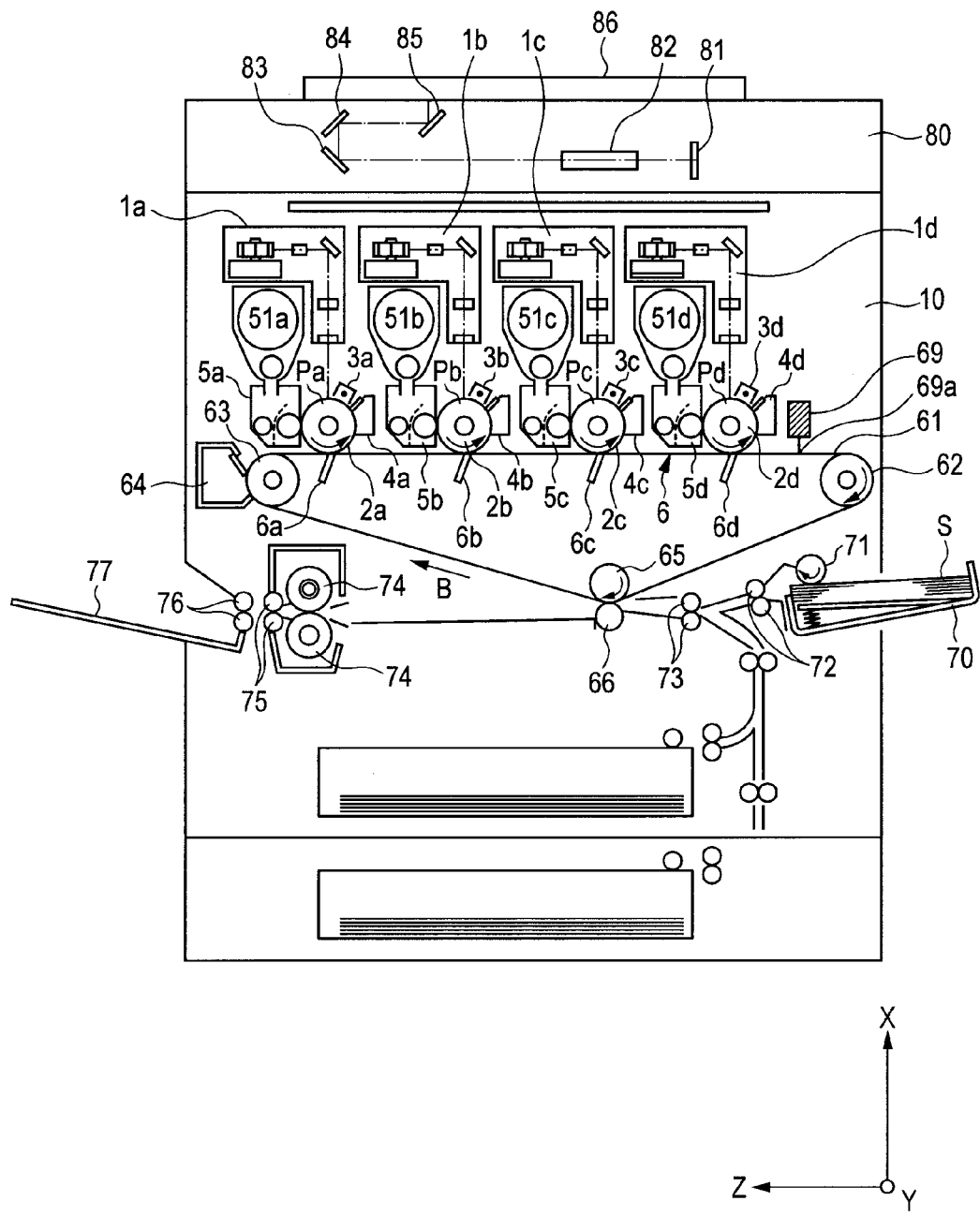
FIG. 16 is a schematic view of a main portion of an image forming apparatus using the image information detection apparatus according to the present invention.

Described below is an image forming apparatus including the image information detection apparatus discussed so far. FIG. 16 is a schematic view of a main portion of the image forming apparatus including the image information detection apparatus according to the present invention, which is applied to a digital full color copier. First, a construction and an operation of the digital full color copier of FIG. 16 are described.

In FIG. 16, in an original reader section 80, image information on a color image placed on an original glass table 86 is read by being formed on a surface of a reading unit 81 of a CCD or the like by using mirrors 83, 84, and 85 and a reading lens 82. Then, the color image information obtained from the reading unit 81 is input to a full color image forming section 10.

In the full color image forming section 10, four (first to fourth) image forming stations (image forming sections (image forming units) Pa to Pd) are arranged. The respective image forming stations (Pa to Pd) include photosensitive drums (2a to 2d) serving as recording members. Further, respectively arranged around the photosensitive drums (2a to 2d) are dedicated charging units (3a to 3d), scanning optical devices (1a to 1d) for illuminating the surface of the photosensitive drum with a light beam corresponding to image information, developing units (5a to 5d), drum cleaning units (4a to 4d), and transferring units (6a to 6d).

Developer containers 51a to 51d corresponding to the respective developing units (5a to 5d) are provided immediately under horizontal portions of the scanning optical devices (1a to 1d) in alignment with vertical portions thereof. The developer containers 51a to 51d perform replenishment of developers by attaching and detaching developer cartridges having a cylindrical shape. Here, the image forming stations (Pa to Pd) form a cyan image, a magenta image, a yellow image, and a black image, respectively.

Meanwhile, a transferring belt (recording member) having an endless belt shape is disposed below the photosensitive drums (2a to 2d) in such manner as to pass the respective image forming stations (Pa to Pd). Further, the transferring belt 61 is stretched around a drive roller 62 and driven rollers 63 and 65, and a cleaning unit 64 for cleaning a front surface thereof is also provided.

The scanning optical devices (1a to 1d) each include a semiconductor laser serving as a light source unit, and an incident optical unit for introducing a light beam exiting from the semiconductor laser to a polygon mirror. The scanning optical devices (1a to 1d) each further include an imaging unit including a toric lens and optical elements such as a spherical lens and an aspherical lens, for causing a light beam deflected by the polygon mirror to image on the surface of the corresponding one of the photosensitive drums (2a to 2d) serving as the recording members. The scanning optical devices (1a to 1d) each further include a reflecting mirror serving as a reflecting member provided between the toric lens and the optical elements, and a receiving unit for integrally receiving those optical elements.

In such a construction, first, a latent image of a cyan component corresponding to image information is formed on the surface of the photosensitive drum 2a by known electrophotographic process units of the first image forming station Pa such as the charging unit 3a and exposure performed by the scanning optical device 1a. After that, the latent image is visualized as a cyan pattern image by the developing unit 5a with the developer having cyan toner, and the cyan pattern image is transferred onto the front surface of the transferring belt 61 by the transferring unit 6a.

While the above-mentioned cyan pattern image is transferred onto the transferring belt 61, in the second image forming station Pb, a latent image of a magenta component is formed, and a pattern image using magenta toner is subsequently obtained by the developing unit 5b. Then, the magenta pattern image is accurately transferred while being overlapped onto the transferring belt 61 on which the transfer has already been finished in the first image forming station Pa, by the transferring unit 6b.

After that, the image formation is performed on the yellow image and the black image by the same method. Thus, overlaying the pattern images of the four colors one on another on the transferring belt 61 is finished. Then, a four-color pattern image on the transferring belt 61 is again transferred (secondarily transferred) onto a sheet material S by a secondary transfer roller 66. The sheet material S is conveyed from a sheet feeding cassette 70 by a sheet feeding roller 71, a conveyance roller pair 72, and a registration roller pair 73 at a good timing. Then, the transferred pattern image is heat-fixed by a fixing roller pair 74 on the sheet material S that has been subjected to the secondary transfer, and a full color image is obtained on the sheet material S. Then, the sheet material S on which the full color image has been formed is sent to a tray 77 via rollers 75 and 76.

Note that, the respective photosensitive drums (2a to 2d) in which the transfer has been finished have the cleaning units (4a to 4d) remove residual toner from the respective photosensitive drums (2a to 2d), and are prepared for subsequent image formation. When facing FIG. 16, image information detection apparatuses 69 having the same configuration are disposed in three positions at the back, the center, and the front of the transferring belt 61. Note that, the surface of the transferring belt 61 is in a state close to a mirror surface.

In this example, before the image forming process is performed, the respective image forming sections Pa, Pb, Pc, and Pd form pattern images 69a for position detection on the transferring belt 61 as four images corresponding to the image forming sections Pa, Pb, Pc, and Pd, respectively. That is, the four images are respectively formed as a whole. For the sake of simplicity, the pattern images for position detection on the left and right are handled as one.

Before executing the above-mentioned process at the image forming sections, the image information detection apparatus 69 detects image information on the pattern images 69a for position detection that have been formed in a non-image forming region of the respective photosensitive drums 2a to 2d and transferred onto the transferring belt 61 in its conveyance direction. Based on detection signals obtained through the detection, the respective image forming sections Pa, Pb, Pc, and Pd are controlled by a control section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-111239, filed May 13, 2010, which is hereby incorporated by reference herein in its entirety.

What is claimed is:

1. A detecting apparatus, comprising:
a light source unit;
an illumination optical system for emitting a light beam exiting from the light source unit on a surface of an image bearing member;
a light receiving unit for receiving the light beam reflected by the surface of the image bearing member; and
an imaging optical system for guiding the light beam reflected by the surface of the image bearing member to the light receiving unit,
wherein the imaging optical system comprises an optical plane for causing a principal ray of the light beam that has been reflected by the surface of the image bearing member to bend in a direction of becoming apart from the light source unit.

2. A detecting apparatus according to claim 1, wherein the principal ray of the light beam before passing through the optical plane of the imaging optical system, which has been reflected by the surface of the image bearing member, and the principal ray of the light beam after passing through the optical plane of the imaging optical system, which has been reflected by the surface of the image bearing member, have an angular difference $\theta 1$ expressed in degrees satisfying $0 < \theta 1 \leq 15$ therebetween.

3. A detecting apparatus according to claim 1, wherein the optical plane of the imaging optical system comprises a curvature plane and the optical plane is tilt-decentered.

4. A detecting apparatus according to claim 1, wherein the optical plane of the imaging optical system comprises a curvature plane and the optical plane is shift-decentered.

5. A detecting apparatus according to claim 1, wherein the illumination optical system has an optical axis perpendicular to the surface of the image bearing member.

6. A detecting apparatus according to claim 1, wherein the imaging optical system comprises a diaphragm for limiting the light beam reflected by the surface of the image bearing member, and
a principal ray of the light beam reflected by the surface of the image bearing member passes through a center of the diaphragm and enters into a center of the light receiving unit.

7. A detecting apparatus according to claim 1, wherein the illumination optical system comprises an optical plane for causing a principal ray of the light beam exited from the light source unit to bend in a direction of becoming apart from the light receiving unit.

8. A detecting apparatus according to claim 1, further comprising a calculation unit for detecting an image information formed on the surface of the image bearing member based on an output from the light receiving unit.

9. A detecting apparatus according to claim 1, wherein the illumination optical system comprises a first optical element of which optical plane at a side of image bearing member has a planar shape, and the imaging optical system comprises a second optical element of which optical plane at a side of image bearing member has a planar shape.

10. A detecting apparatus, comprising:
a light source unit;
an illumination optical system for emitting a light beam exiting from the light source unit on a surface of an image bearing member;
a light receiving unit for receiving the light beam reflected by the surface of the image bearing member; and an imaging optical system for guiding the light beam reflected by the surface of the image bearing member on the light receiving unit, wherein the illumination optical system comprises an optical plane for causing a principal ray of the light beam that has exited from the light source unit to bend in a direction of becoming apart from the light receiving unit.

11. A detecting apparatus according to claim 10, wherein the imaging optical system comprises an optical plane for causing a principal ray of the light beam reflected by the surface of the image bearing member to bend in a direction of becoming apart from the light source unit.

12. A detecting apparatus according to claim 10, further comprising a calculation unit for detecting an image information formed on the surface of the image bearing member based on an output from the light receiving unit.

13. A detecting apparatus according to claim 10, wherein the illumination optical system comprises a first optical element of which optical plane at a side of image bearing member has a planar shape, and the imaging optical system comprises a second optical element of which optical plane at a side of image bearing member has a planar shape.

14. A detecting apparatus according to claim 10, wherein a principal ray of the light beam exited from the light source unit is a central ray of the light beam exited from the light source.

15. A detecting apparatus according to claim 10, wherein, the principal ray of the light beam before passing through the optical plane of the illumination optical system, which has exited from the light source unit, and the principal ray of the light beam after passing through the optical plane of the illumination optical system, which has exited from the light source unit, have an angular difference θ2 expressed in degrees satisfying 0<θ2≤15 therebetween.

16. A detecting apparatus according to claim 10, wherein the optical plane of the illumination optical system comprises a curvature plane and the optical plane is tilt-decentered.

17. A detecting apparatus according to claim 10, wherein, the optical plane of the illumination optical system comprises a curvature plane and the optical plane is sift-decentered.

18. An image forming apparatus, comprising:
a detecting apparatus including:
a light source unit;
an illumination optical system for emitting a light beam exiting from the light source unit on a surface of an image bearing member;
a light receiving unit for receiving the light beam reflected by the surface of the image bearing member; and
an imaging optical system for guiding the light beam reflected by the surface of the image bearing member to the light receiving unit,
wherein the imaging optical system comprises an optical plane for causing a principal ray of the light beam that has been reflected by the surface of the image bearing member to bend in a direction of becoming apart from the light source unit; and
an image forming system for forming an image on the surface of the image bearing member.

19. An image forming apparatus, comprising:
a detecting apparatus including:
a light source unit;
an illumination optical system for emitting a light beam exiting from the light source unit on a surface of an image bearing member;
a light receiving unit for receiving the light beam reflected by the surface of the image bearing member; and
an imaging optical system for guiding the light beam reflected by the surface of the image bearing member on the light receiving unit,
wherein the illumination optical system comprises an optical plane for causing a principal ray of the light beam that has exited from the light source unit to bend in a direction of becoming apart from the light receiving unit; and
an image forming system for forming an image on the surface of the image bearing member.

* * * * *